United States Patent
Davydov et al.

(10) Patent No.: US 11,575,554 B2
(45) Date of Patent: Feb. 7, 2023

(54) SCRAMBLING SEQUENCE INITIAL SEED CONFIGURATION FOR REFERENCE SIGNALS, DATA, AND CONTROL CHANNEL FOR NEW RADIO

(71) Applicant: Apple Inc., Cupertino, CA (US)

(72) Inventors: Alexei Davydov, Nizhny Novgorod (RU); Gang Xiong, Portland, OR (US); Debdeep Chatterjee, San Jose, CA (US); Hong He, Sunnyville, CA (US); Gregory Morozov, Nizhny Novgorod (RU); Sameer Pawar, Santa Clara, CA (US); Yushu Zhang, Beijing (CN); Victor Sergeev, Nizhny Novgorod (RU); Dmitry Dikarev, Nizhny Novgorod (RU); Daewon Lee, Portland, OR (US)

(73) Assignee: Apple Inc., Cupertino, CA (US)

(*) Notice: Subject to any disclaimer, the term of this patent is extended or adjusted under 35 U.S.C. 154(b) by 530 days.

(21) Appl. No.: 16/055,964

(22) Filed: Aug. 6, 2018

(65) Prior Publication Data

US 2019/0044669 A1 Feb. 7, 2019

Related U.S. Application Data

(60) Provisional application No. 62/591,075, filed on Nov. 27, 2017, provisional application No. 62/544,621, (Continued)

(51) Int. Cl.
*H04W 72/04* (2009.01)
*H04L 27/26* (2006.01)
(Continued)

(52) U.S. Cl.
CPC ....... *H04L 27/2613* (2013.01); *H04B 7/0626* (2013.01); *H04L 1/0026* (2013.01);
(Continued)

(58) Field of Classification Search
CPC ..... H04L 5/005; H04L 5/0051; H04L 1/0026; H04L 27/2613; H04L 5/0007;
(Continued)

(56) References Cited

U.S. PATENT DOCUMENTS

2008/0095036 A1* 4/2008 Gorokhov ............. H04W 52/56
370/203
2009/0028256 A1* 1/2009 van Veen ............... H04L 5/0053
375/260
(Continued)

FOREIGN PATENT DOCUMENTS

WO WO-2019022575 A1 * 1/2019 .......... H04J 11/0069

OTHER PUBLICATIONS

Si et al., U.S. Appl. No. 62/537,692 "Method and Apparatus for NR-DMRS Sequence Design", Jul. 17, 2017, whole document (Year: 2017).*

(Continued)

*Primary Examiner* — Michael Thier
*Assistant Examiner* — Jose L Perez
(74) *Attorney, Agent, or Firm* — Eschweiler & Potashnik, LLC

(57) ABSTRACT

A scrambling sequence generation method is disclosed for reference signals, data, and downlink and uplink control channels. The scrambling sequence generation method determines an initial seed value used to calculate the scrambling sequence. The initial seed value is based on different parameters relating to the to be transmitted signals, and some of these parameters are explicitly defined for New Radio.

13 Claims, 20 Drawing Sheets

Related U.S. Application Data filed on Aug. 11, 2017, provisional application No. 62/544,264, filed on Aug. 11, 2017.

(51) Int. Cl.

| | |
|---|---|
| *H04L 5/00* | (2006.01) |
| *H04B 7/06* | (2006.01) |
| *H04W 76/11* | (2018.01) |
| *H04W 76/27* | (2018.01) |
| *H04L 1/00* | (2006.01) |
| *H04W 88/06* | (2009.01) |

(52) U.S. Cl.
CPC ............ *H04L 5/005* (2013.01); *H04L 5/0051* (2013.01); *H04W 72/0446* (2013.01); *H04W 72/0466* (2013.01); *H04W 76/11* (2018.02); *H04W 76/27* (2018.02); *H04L 5/0007* (2013.01); *H04L 27/26132* (2021.01); *H04W 88/06* (2013.01)

(58) Field of Classification Search
CPC .... H04B 7/0626; H04W 76/11; H04W 76/27; H04W 72/0466; H04W 72/0446; H04W 88/06
See application file for complete search history.

(56) References Cited

U.S. PATENT DOCUMENTS

| | | | | |
|---|---|---|---|---|
| 2012/0176885 | A1* | 7/2012 | Lee | H04L 5/0007 370/209 |
| 2013/0121266 | A1* | 5/2013 | Ko | H04L 27/2613 370/329 |
| 2013/0322273 | A1* | 12/2013 | Etemad | H04W 28/0289 370/252 |
| 2014/0169276 | A1* | 6/2014 | Choi | H04L 1/1854 370/328 |
| 2014/0293943 | A1* | 10/2014 | Yoon | H04L 5/0091 370/329 |
| 2014/0321383 | A1* | 10/2014 | Wu | H04J 13/10 370/329 |
| 2015/0181576 | A1* | 6/2015 | Papasakellariou | H04L 5/0053 370/329 |
| 2016/0353420 | A1* | 12/2016 | You | H04L 5/0053 |
| 2017/0150500 | A1* | 5/2017 | Ahn | H04W 74/0808 |
| 2018/0013480 | A1* | 1/2018 | Lomayev | H04L 5/0023 |
| 2018/0131493 | A1* | 5/2018 | Luo | H04L 5/0053 |
| 2018/0227867 | A1* | 8/2018 | Park | H04L 5/005 |
| 2018/0241525 | A1* | 8/2018 | Ouchi | H04L 5/0053 |
| 2018/0249339 | A1* | 8/2018 | Noh | H04W 16/14 |
| 2018/0262308 | A1* | 9/2018 | Si | H04L 5/0051 |
| 2018/0279341 | A1* | 9/2018 | Yamada | H04L 1/1887 |
| 2018/0288771 | A1* | 10/2018 | Hosseini | H04W 72/0446 |
| 2018/0367358 | A1* | 12/2018 | Baligh | H04L 5/0057 |
| 2019/0036746 | A1* | 1/2019 | Hwang | H04L 27/22 |
| 2019/0053072 | A1* | 2/2019 | Kundargi | H04L 43/16 |
| 2019/0069284 | A1* | 2/2019 | Wang | H04J 13/10 |
| 2019/0089504 | A1* | 3/2019 | Hwang | H04L 27/26 |
| 2019/0166569 | A1* | 5/2019 | Wu | H04J 11/0069 |
| 2019/0349893 | A1* | 11/2019 | Li | H04W 72/0446 |
| 2019/0364588 | A1* | 11/2019 | Lu | H04W 88/08 |
| 2020/0052939 | A1* | 2/2020 | Xiong | H04L 5/0048 |
| 2020/0127786 | A1* | 4/2020 | Kwak | H04L 27/261 |
| 2020/0169440 | A1* | 5/2020 | Thomas | H04L 5/0044 |
| 2021/0092696 | A1* | 3/2021 | Ko | H04L 5/0051 |
| 2021/0136827 | A1* | 5/2021 | Xiong | H04L 5/0044 |
| 2022/0173871 | A1* | 6/2022 | Luo | H04L 49/552 |

OTHER PUBLICATIONS

Luo et al., Sequence generation for systems supporting mixed numerologies, Nov. 10, 2016, U.S. Appl. No. 62/420,462 [provisional of US 2018/0131493 A1], whole document (Year: 2016).*

Ko et al., Data demodulation reference signal design and time index indication method for NR, Jul. 28, 2017, U.S. Appl. No. 62/538,065 [provisional of WO 2019/022575 A1], whole document (Year: 2017).*

Kundargi et al., Beam management for MMWave in New Radio, Aug. 11, 2017, U.S. Appl. No. 62/544,719 [provisional of US 2019/0053072 A1], whold document (Year: 2017).*

Wikipedia, entry for Scrambler, Nov. 30, 2016, web.archive.org/web/20161130111556/https://en.wikipedia.org/wiki/Scrambler, whole document (Year: 2016).*

Wikipedia entry for linear feedback shift register, Mar. 24, 2017, web.archive.org/web/20170324104200/https://en.wikipedia.org/wiki/Linear-feedback_shift_register, whole document (Year: 2017).*

3rd Generation Partnership Project, 3GPP TS 36.211 V14.3.0, Jun. 2017, pp. 100 and 121 (Year: 2017).*

Hosseini et al., Techniques to Provide Interference Diversity in Low Latency and High Reliability Wireless Communication Systems, Apr. 3, 2017, U.S. Appl. No. 62/481,079 [provisional of US 2018/0288771 A1], whole document (Year: 2017).*

* cited by examiner

600

1000A

1200A

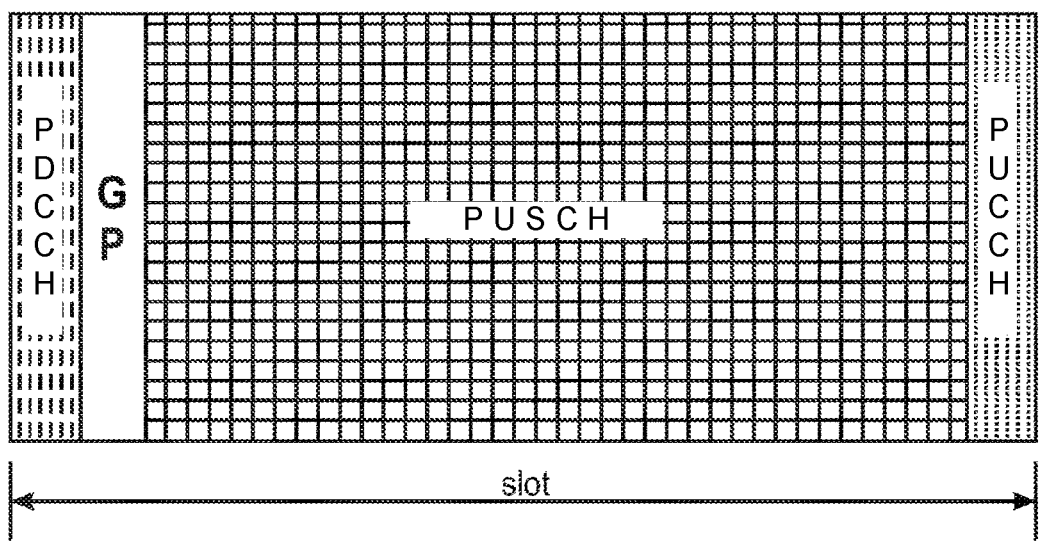
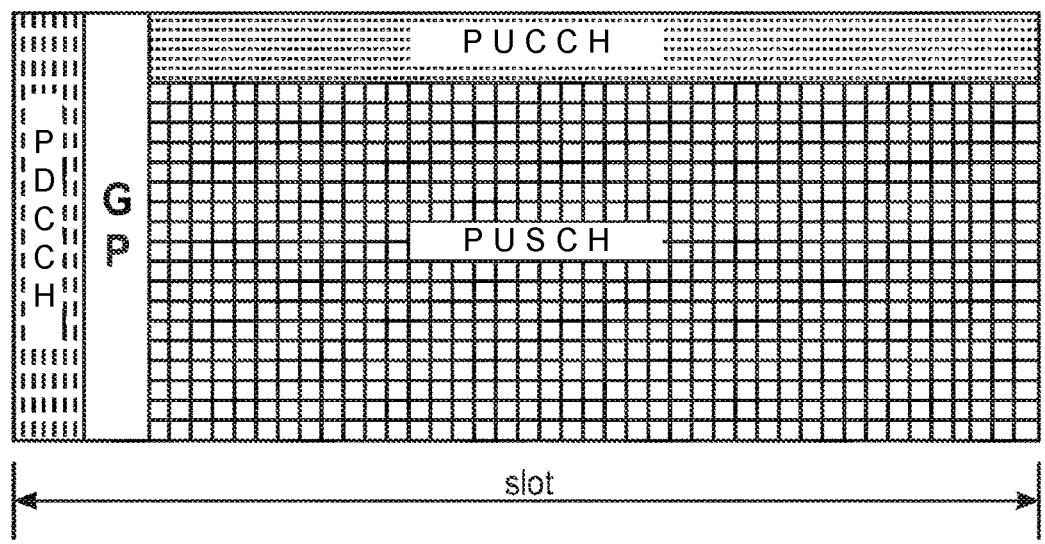
1300
Figure 13

| eq | equation | parameters | | | | |
|---|---|---|---|---|---|---|
| 2 | $c_{init} = (\lfloor n_s/2 \rfloor + 1) \cdot (2 n_{ID}^{(n_{SCID})} + 1) \cdot 2^{16} + n_{SCID}$ | $n_s$ | $n_{ID}$ | $n_{SCID}$ | | |
| 3 | $c_{init} = (n_l + 1) \cdot (n_s + 1) \cdot 2 n_{ID} + 1) \cdot 2^6 + n_{SCS} \cdot 2^2 + n_{SCID} \cdot 2 + n_{CP}$ | $n_s$ | $n_{ID}$ | $n_{SCID}$ | $n_l$ | $n_{SCS}$ | $n_{CP}$ |
| 4 | $c_{init} = 2^{13} \cdot (7 \cdot (n_s + 1) + l + 1) \cdot (2 \cdot n_{ID}^{CSI} + 1) + 2 \cdot n_{SCS} + 2 \cdot N_{ID}^{CSI} + n_{CP}$ | $n_s$ | $l$ | $n_{SCS}$ | $n_{ID}^{CSI}$ | $n_{CP}$ |
| 5 | $c_{init} = n_{RNTI} \cdot 2^{14} + q \cdot 2^{13} + \lfloor n_s/2 \rfloor \cdot 2^9 + N_{ID}^{cell}$ | $n_s$ | $n_{RNTI}$ | $q$ | $N_{ID}^{cell}$ | |
| 6 | $c_{init} = n_{RNTI} \cdot C_0 + q \cdot C_1 + n_s \cdot C_2 + N_{ID}^{cell}$ | $n_s$ | $n_{RNTI}$ | $q$ | $N_{ID}^{cell}$ | |
| 8 | $c_{init} = n_{RNTI} \cdot C_0 + q \cdot C_1 + n_s \cdot C_2 + N_{ID}^{data}$ | $n_s$ | $n_{RNTI}$ | $q$ | $N_{ID}^{data}$ | |
| 9 | $c_{init} = n_{RNTI} \cdot 2^{20} + q \cdot 2^{19} + n_s \cdot 2^{18} + N_{ID}^{data}$ | $n_s$ | $n_{RNTI}$ | $q$ | $N_{ID}^{data}$ | |
| 10 | $c_{init} = n_{RNTI} \cdot 2^{19} + q \cdot 2^{18} + n_s \cdot 2^{10} + N_{ID}^{data}$ | $n_s$ | $n_{RNTI}$ | $q$ | $N_{ID}^{data}$ | |
| 11 | $c_{init} = n_{RNTI} \cdot C_0 + q \cdot C_1 + n_s \cdot C_2 + l \cdot C_3 + N_{ID}^{cell}$ | $n_s$ | $n_{RNTI}$ | $q$ | $N_{ID}^{cell}$ | $l$ |
| 12 | $c_{init} = n_{RNTI} \cdot C_0 + q \cdot C_1 + (N_s \cdot (n_s + 1) + l + 1) \cdot C_2 + N_{ID}^{cell}$ | $n_s$ | $n_{RNTI}$ | $q$ | $N_{ID}^{cell}$ | $N_S$ |
| 13 | $c_{init} = n_{RNTI} \cdot C_0 + q \cdot C_1 + n_s \cdot C_2 + l \cdot C_3 + N_{ID}^{data}$ | $n_s$ | $n_{RNTI}$ | $q$ | $N_{ID}^{data}$ | $l$ |
| 14 | $c_{init} = n_{RNTI} \cdot C_0 + q \cdot C_1 + (N_s \cdot (n_s + 1) + l + 1) \cdot C_2 + N_{ID}^{data}$ | $n_s$ | $n_{RNTI}$ | $q$ | $N_{ID}^{data}$ | $N_S$ |
| 15 | $c_{init} = n_{RNTI} \cdot 2^{24} + q \cdot 2^{23} + n_s \cdot 2^{14} + l \cdot 2^{10} + N_{ID}^{data}$ | $n_s$ | $n_{RNTI}$ | $q$ | $N_{ID}^{data}$ | $l$ |

1400A
Figure 14A

| eq | equation | | | parameters | |
|---|---|---|---|---|---|
| 16 | $c_{init} = n_{RNTI} \cdot 2^{24} + q \cdot 2^{23} + (14 \cdot (n_s + 1) + l + 1) \cdot 2^{10} + N_{ID}^{data}$ | $n_s$ | $n_{RNTI}$ | $q$ | $N_{ID}^{data}$ |
| 17 | $c_{init} = \lfloor n_s/2 \rfloor \cdot 2^9 + N_{ID}^{cell}$ | $n_s$ | $N_{ID}^{cell}$ | | |
| 18 | $c_{init} = \lfloor n_s/2 \rfloor \cdot 2^9 + N_{ID,m}^{EPDCCH}$ | $n_s$ | $N_{ID,m}^{EPDCCH}$ | | |
| 19 | $c_{init} = n_s \cdot c_0 + N_{ID}^{cell}$ | $n_s$ | $N_{ID}^{cell}$ | | |
| 20 | $c_{init} = n_s \cdot c_0 + N_{ID,m}^{PDCCH}$ | $n_s$ | $N_{ID,m}^{PDCCH}$ | | |
| 21 | $c_{init} = n_s \cdot c_0 + l \cdot c_1 + N_{ID}^{cell}$ | $n_s$ | $N_{ID}^{cell}$ | $l$ | |
| 22 | $c_{init} = (N_s \cdot (n_s + 1) + l + 1) \cdot c_0 + N_{ID}^{cell}$ | $n_s$ | $N_{ID}^{cell}$ | $l$ | |
| 23 | $c_{init} = n_s \cdot c_0 + l \cdot c_1 + N_{ID,m}^{PDCCH}$ | $n_s$ | $N_{ID,m}^{PDCCH}$ | $l$ | |
| 24 | $c_{init} = (N_s \cdot (n_s + 1) + l + 1) \cdot c_0 + N_{ID,m}^{PDCCH}$ | $n_s$ | $N_s$ | $l$ | |
| 25 | $c_{init} = n_s \cdot c_0 + N_{ID,l}^{PDCCH}$ | $n_s$ | $N_{ID,m}^{PDCCH}$ | | |
| 26 | $c_{init} = (\lfloor n_s/2 \rfloor + 1) \cdot (2N_{ID}^{cell} + 1) \cdot 2^{16} + n_{RNTI}$ | $n_s$ | $n_{RNTI}$ | $N_{ID}^{cell}$ | |
| 27 | $c_{init} = (n_s + 1) \cdot (2N_{ID}^{cell} + 1) \cdot c_0 + n_{RNTI}$ | $n_s$ | $n_{RNTI}$ | $N_{ID}^{cell}$ | |
| 28 | $c_{init} = (n_s + 1) \cdot (2N_{ID}^{PUCCH} + 1) \cdot c_0 + n_{RNTI}$ | $n_s$ | $n_{RNTI}$ | $N_{ID}^{PUCCH}$ | |
| 29 | $c_{init} = (N_s \cdot (n_s + 1) + l + 1) \cdot (2N_{ID}^{cell} + 1) \cdot c_0 + n_{RNTI}$ | $n_s$ | $n_{RNTI}$ | $N_{ID}^{cell}$ | $N_s$ | $l$ |
| 30 | $c_{init} = (N_s \cdot (n_s + 1) + l + 1) \cdot (2N_{ID}^{PUCCH} + 1) \cdot c_0 + n_{RNTI}$ | $n_s$ | $n_{RNTI}$ | $N_{ID}^{PUCCH}$ | $N_s$ | $l$ |

1400B
Figure 14B

SCRAMBLING SEQUENCE INITIAL SEED CONFIGURATION FOR REFERENCE SIGNALS, DATA, AND CONTROL CHANNEL FOR NEW RADIO

CROSS-REFERENCE TO RELATED APPLICATIONS

This application is a continuation of and claims priority to U.S. Provisional Patent Applications No. 62/544,264 and 62/544,621, filed on Aug. 11, 2017, and on Provisional Patent Application No. 62/591,075, filed on Nov. 27, 2017, all of which are incorporated herein by reference in their entirety.

TECHNICAL FIELD

This application relates to scrambling sequences for QPSK modulation and, more particularly, to the initial seed value used to generate the scrambling sequences.

BACKGROUND

The Evolved Packet Core (EPC), the core network of advanced mobile communication systems, allows different radio access technologies (RATs), such as first generation wireless Local Area Networks (LANs), second generation (2G) systems, such as Global System for Mobile communication (GSM), third generation (3G) systems, such as the Universal Mobile Telecommunication System (UMTS), fourth generation (4G) systems, such as Long Term Evolution (LTE) and LTE-Advanced, (LTE-A), and fifth generation (5G) technology, known as New Radio (NR), to operate in an integrated manner. Under LTE, a User Equipment (UE) connects to the EPC over the LTE access network known as E-UTRAN (short for Evolved UMTS Terrestrial Radio Access Network) and communicates with a base station known as the Evolved NodeB (eNB), which may physically consist of multiple base stations and/or radio heads. Under NR, the base station is known as a $5^{th}$ generation Node B (gNB). The EPC, part of the $3^{rd}$ Generation Partnership Project (3GPP) specification, is a packet-switched network in which the Internet Protocol is used for all transport services In 3GPP, both Frequency Division Duplex (FDD) and Time Division Duplex (TDD) transmissions are described in terms of a radio frame having subframes. Once synchronization between the eNB and the UE has been established, known reference signals (RS), of which there are several types, are inserted into the transmitted signal structure, in other words, along the radio frame at predefined locations in the subframe.

Mobile communication has evolved from early voice systems to highly sophisticated integrated communication platforms. 5G (NR) enables information and sharing of data anywhere and anytime by various users and applications. NR is expected to be a unified network/system that targets to meet different and sometimes conflicting performance dimensions and services. Such diverse multi-dimensional specifications are driven by different services and applications. In general, NR will evolve based on the 3GPP LTE Advanced with additional potential new RATs to promote better, simple, and seamless wireless connectivity solutions. NR is designed to deliver fast and rich content and services to connected wireless entitles.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 13 illustrates the PUCCH in New Radio with short and long duration within the UL data slot, according to some embodiments.

FIGS. 14A and 14B list equations used in the initial seed configuration method of FIGS. 9A-9D, according to some embodiments.

DETAILED DESCRIPTION

In accordance with the embodiments described herein, a scrambling sequence generation method is disclosed for reference signals, data, and control channels. The scrambling sequence generation method determines an initial seed value used to calculate the scrambling sequence. The initial seed value is based on different parameters relating to the to be transmitted signals, and some of these parameters are explicitly defined for New Radio.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. In other instances, well-known structures, materials, or operations are not shown or described in detail to avoid obscuring aspects of the disclosure. The following detailed description is, therefore, not to be construed in a limiting sense, as the scope of the subject matter is defined by the claims.

Introductory FIGS. 1-8 provide context for the scrambling sequence generation method described herein, which is introduced in FIGS. 9A-9D and further described and illustrated in FIGS. 10A-14B, below.

Figure 1:
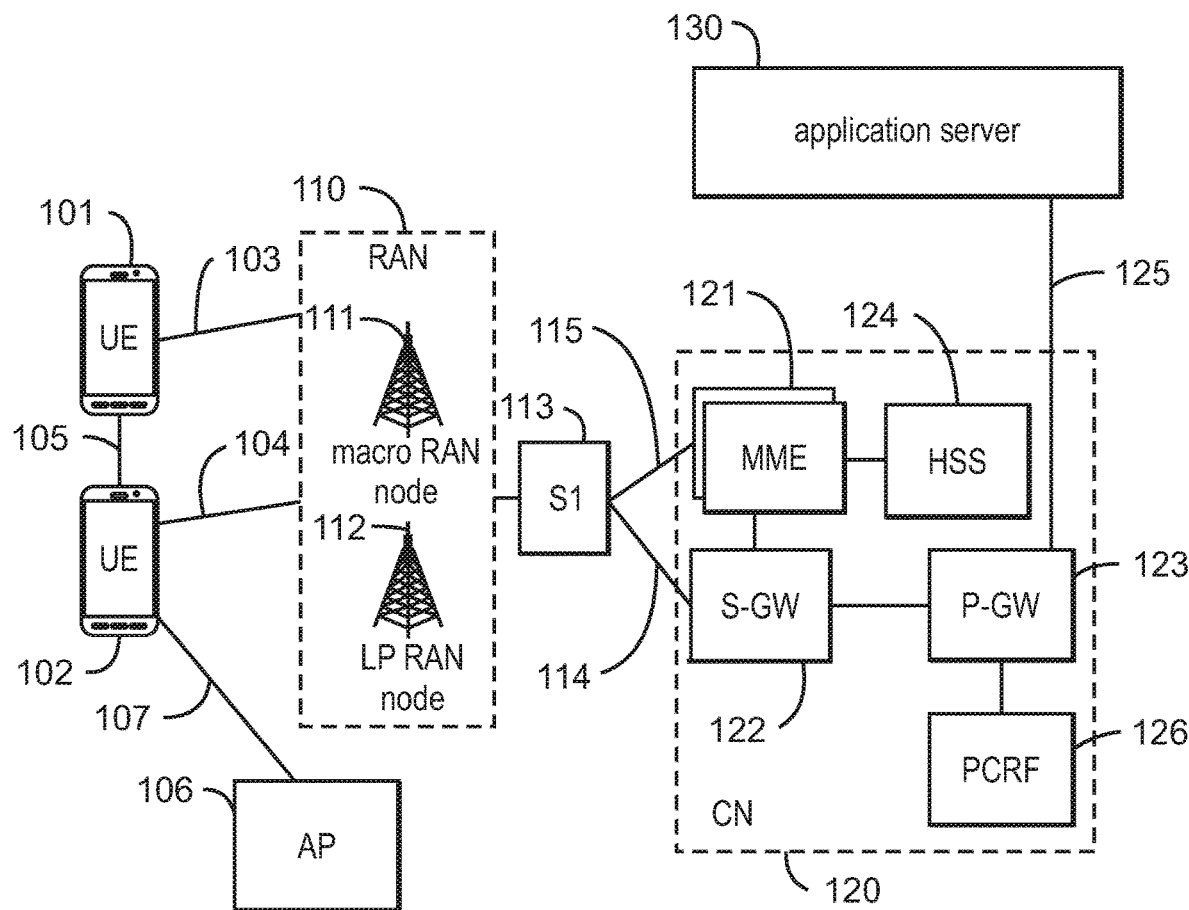
FIG. 1 illustrates an architecture of a system of a network, in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
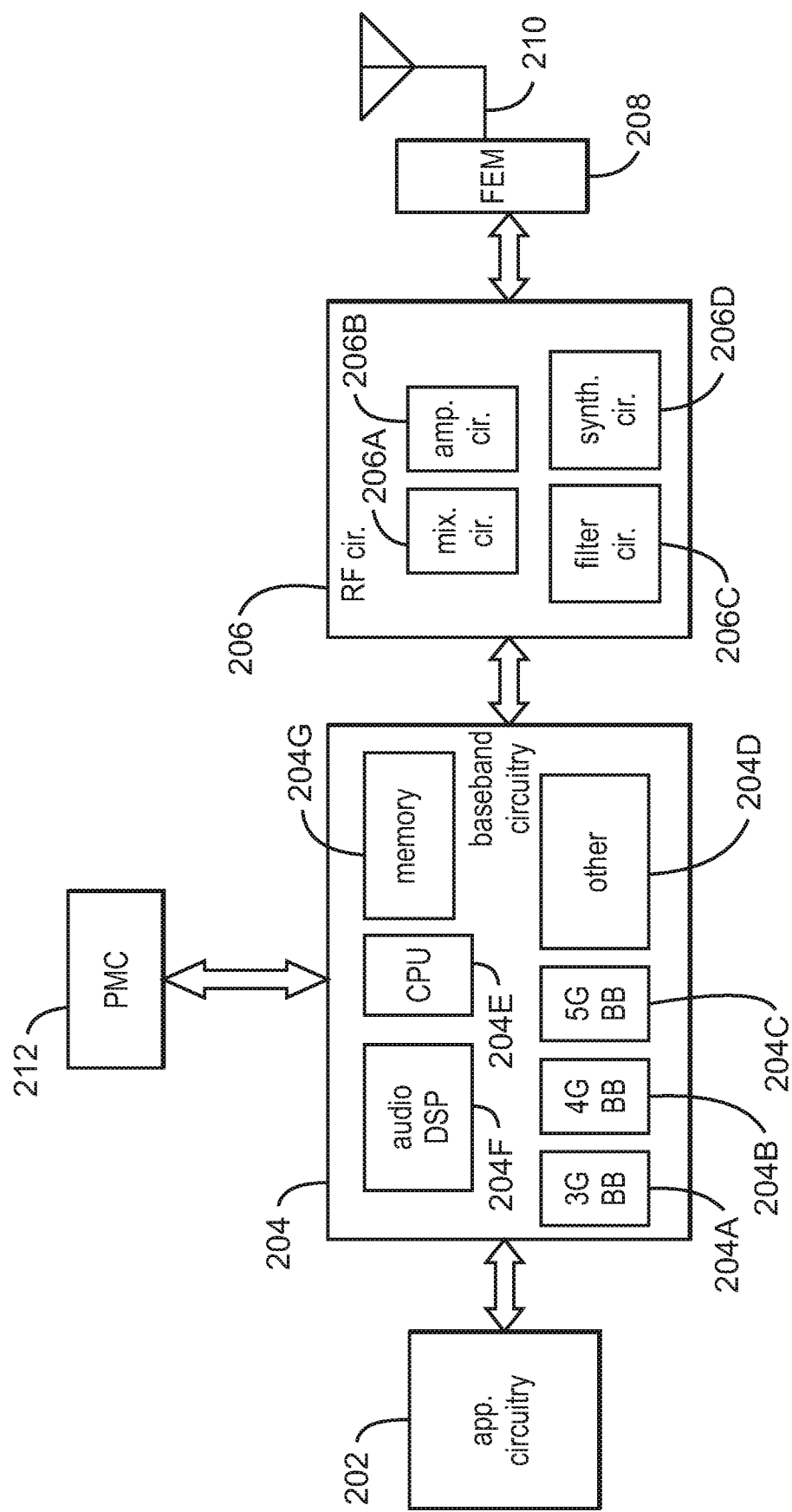
FIG. 2 illustrates example components of a device, in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
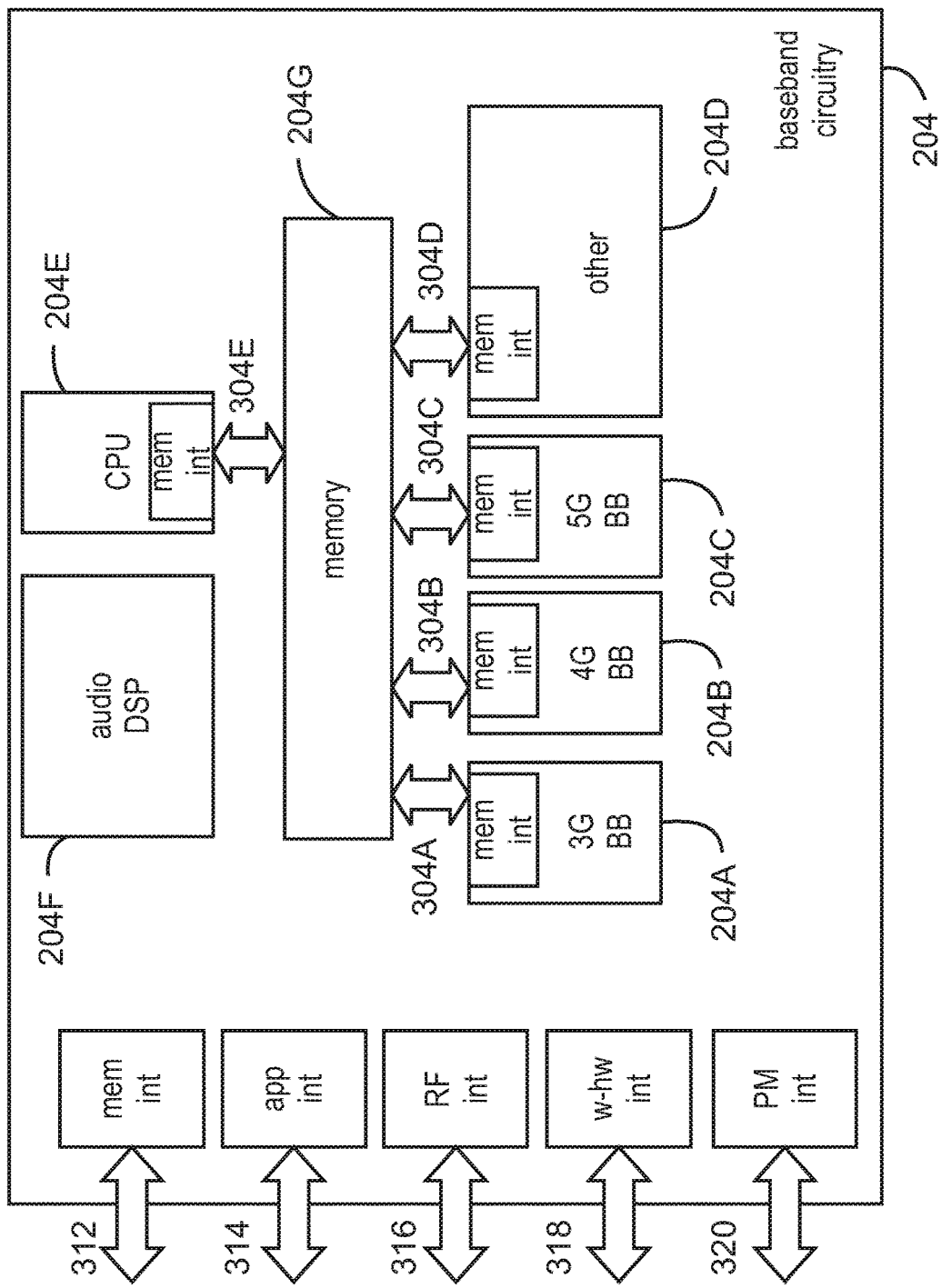
FIG. 3 illustrates example interfaces of baseband circuitry, in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
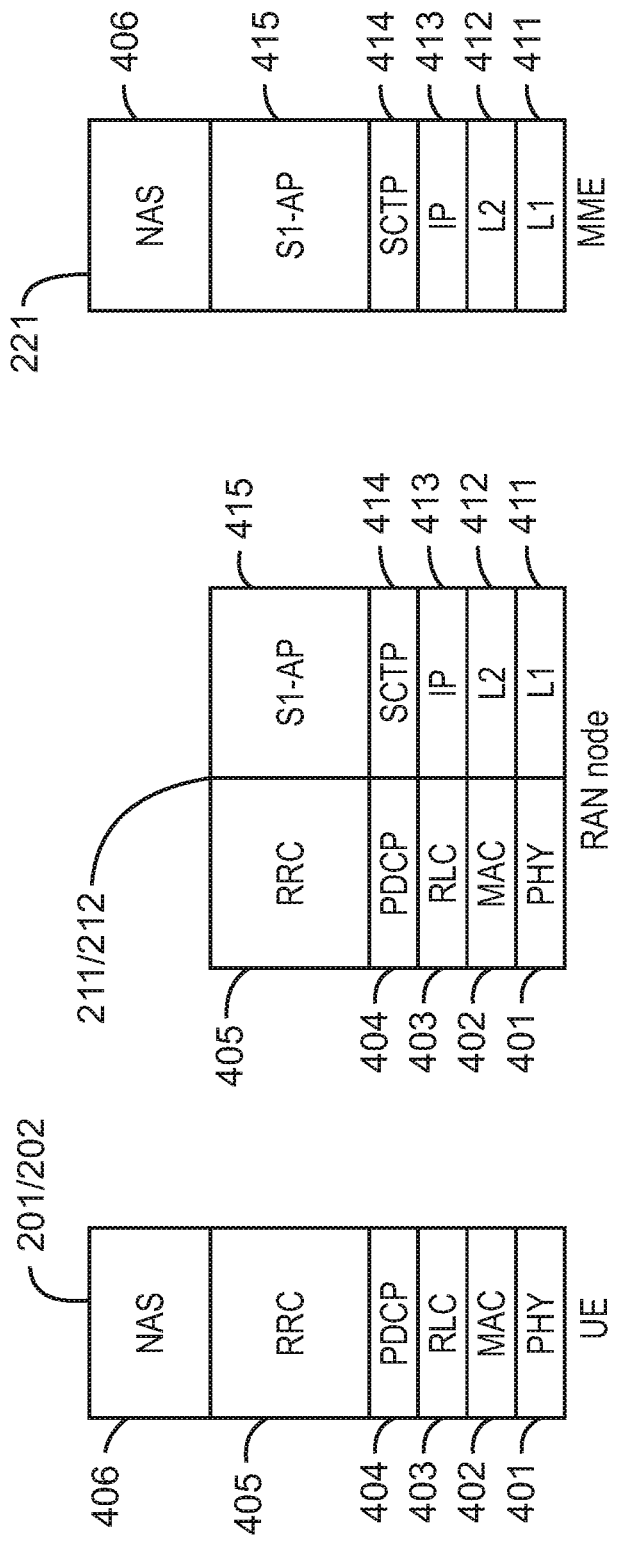
FIG. 4 is an illustration of a control plane protocol stack, in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
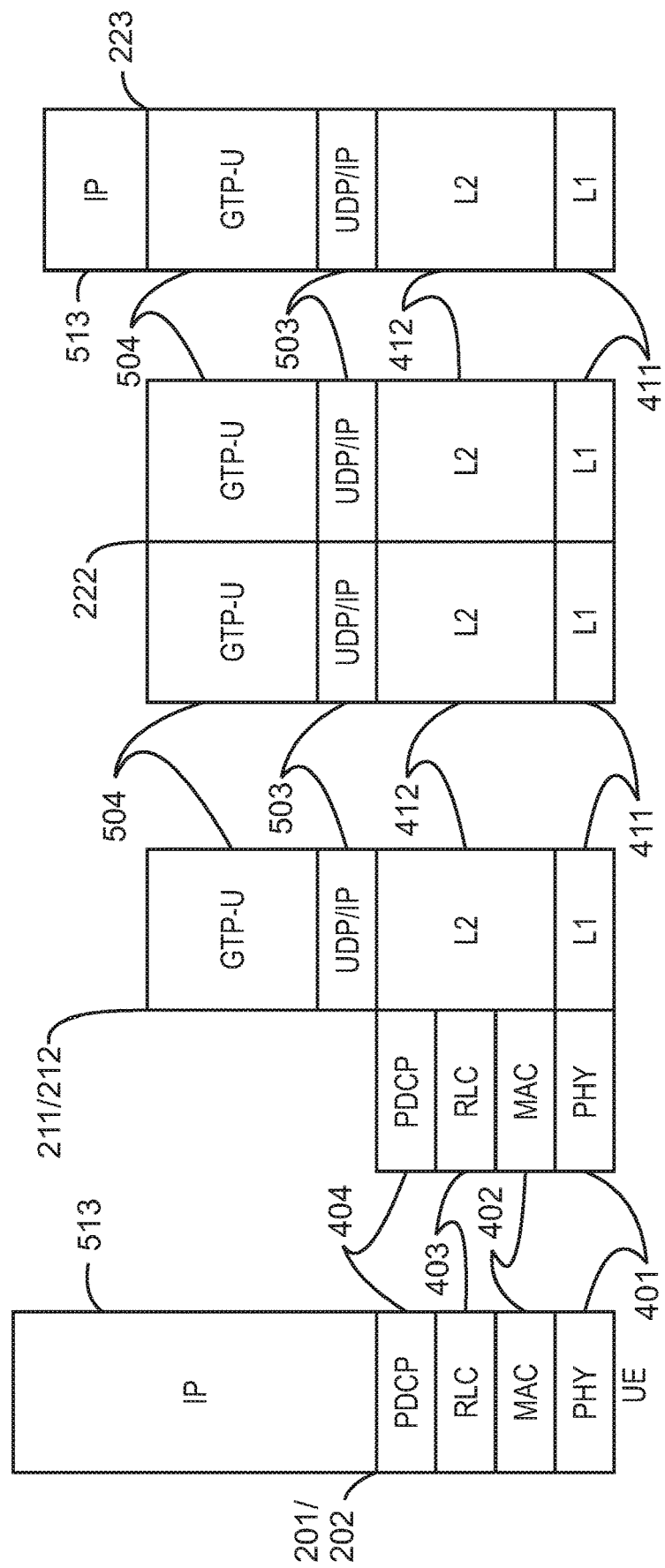
FIG. 5 is an illustration of a user plane protocol stack, in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
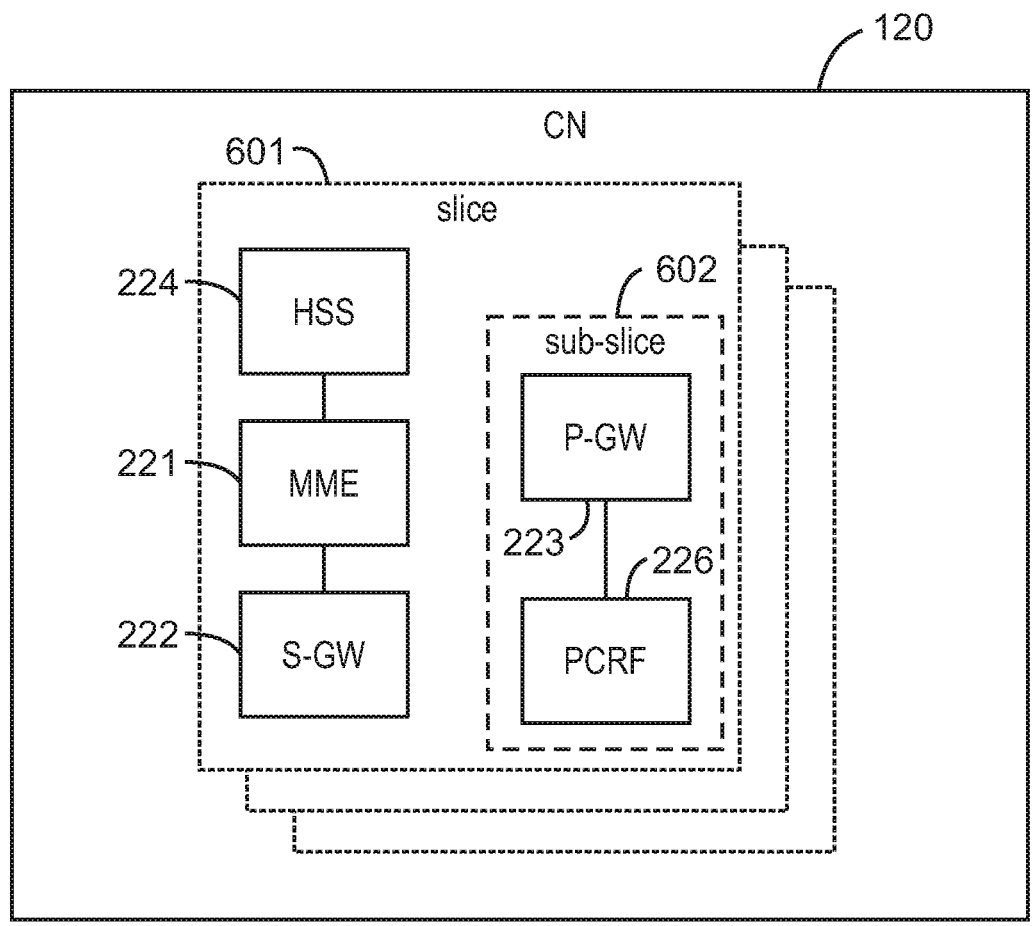
FIG. 6 illustrates components of a core network, in accordance with some embodiments.

FIG. 6 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 120 may be referred to as a network slice 601. A logical instantiation of a portion of the CN 120 may be referred to as a network sub-slice 602 (e.g., the network sub-slice 602 is shown to include the PGW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 7:
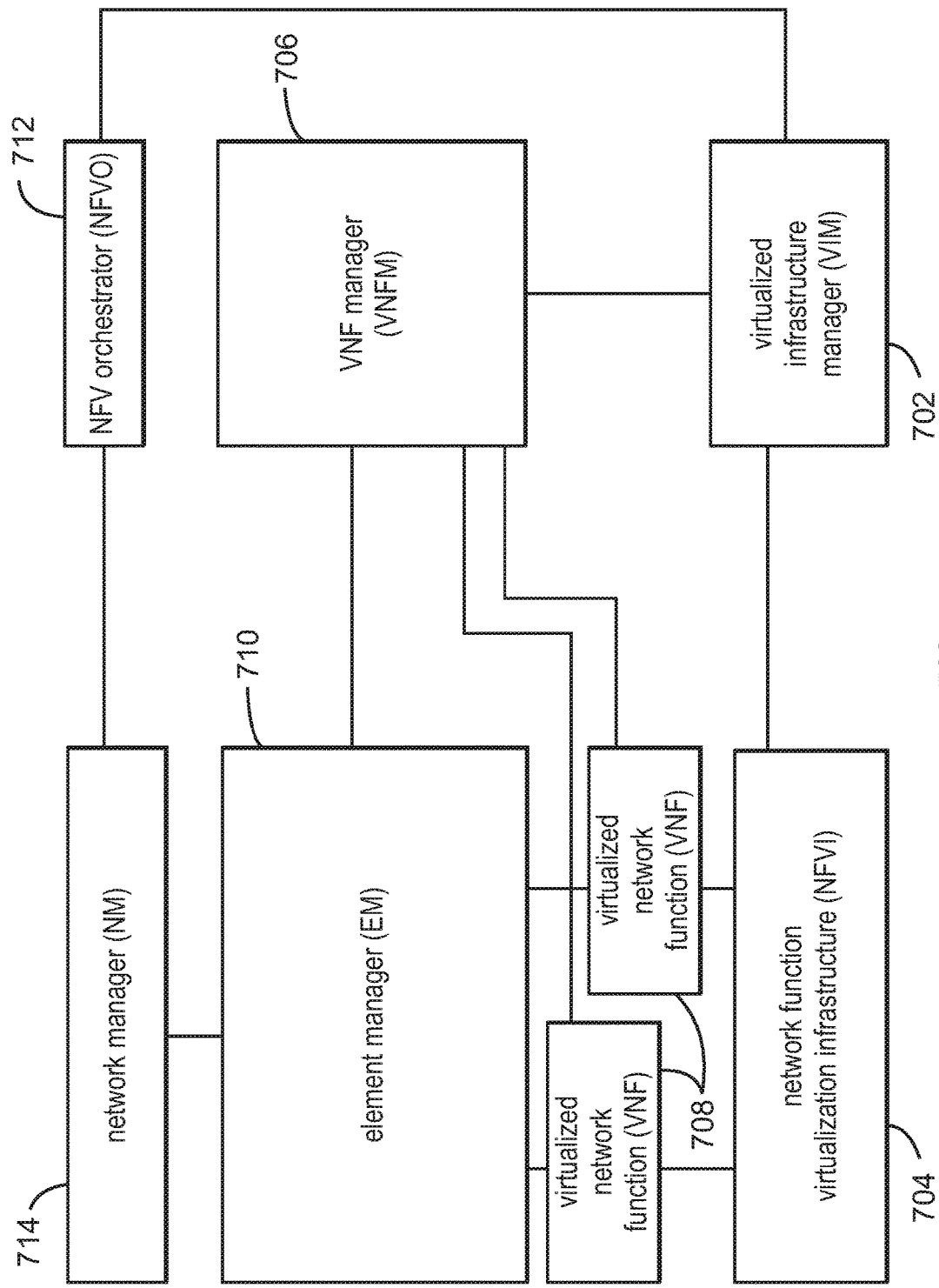
FIG. 7 is a block diagram illustrating components of a system to support NFV, in accordance with some embodiments.

FIG. 7 is a block diagram illustrating components, according to some example embodiments, of a system 700 to support NFV. The system 700 is illustrated as including a virtualized infrastructure manager (VIM) 702, a network function virtualization infrastructure (NFVI) 704, a VNF manager (VNFM) 706, virtualized network functions (VNFs) 708, an element manager (EM) 710, an NFV Orchestrator (NFVO) 712, and a network manager (NM) 714.

The VIM 702 manages the resources of the NFVI 704. The NFVI 704 can include physical or virtual resources and applications (including hypervisors) used to execute the system 700. The VIM 702 may manage the life cycle of virtual resources with the NFVI 704 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 706 may manage the VNFs 708. The VNFs 708 may be used to execute EPC components/functions. The VNFM 706 may manage the life cycle of the VNFs 708 and track performance, fault and security of the virtual aspects of VNFs 708. The EM 710 may track the performance, fault and security of the functional aspects of VNFs 708. The tracking data from the VNFM 706 and the EM 710 may comprise, for example, performance measurement (PM) data used by the VIM 702 or the NFVI 704. Both the VNFM 706 and the EM 710 can scale up/down the quantity of VNFs of the system 700.

The NFVO 712 may coordinate, authorize, release and engage resources of the NFVI 704 in order to provide the requested service (e.g., to execute an EPC function, component, or slice). The NM 714 may provide a package of end-user functions with the responsibility for the management of a network, which may include network elements with VNFs, non-virtualized network functions, or both (management of the VNFs may occur via the EM 710).

Figure 8:
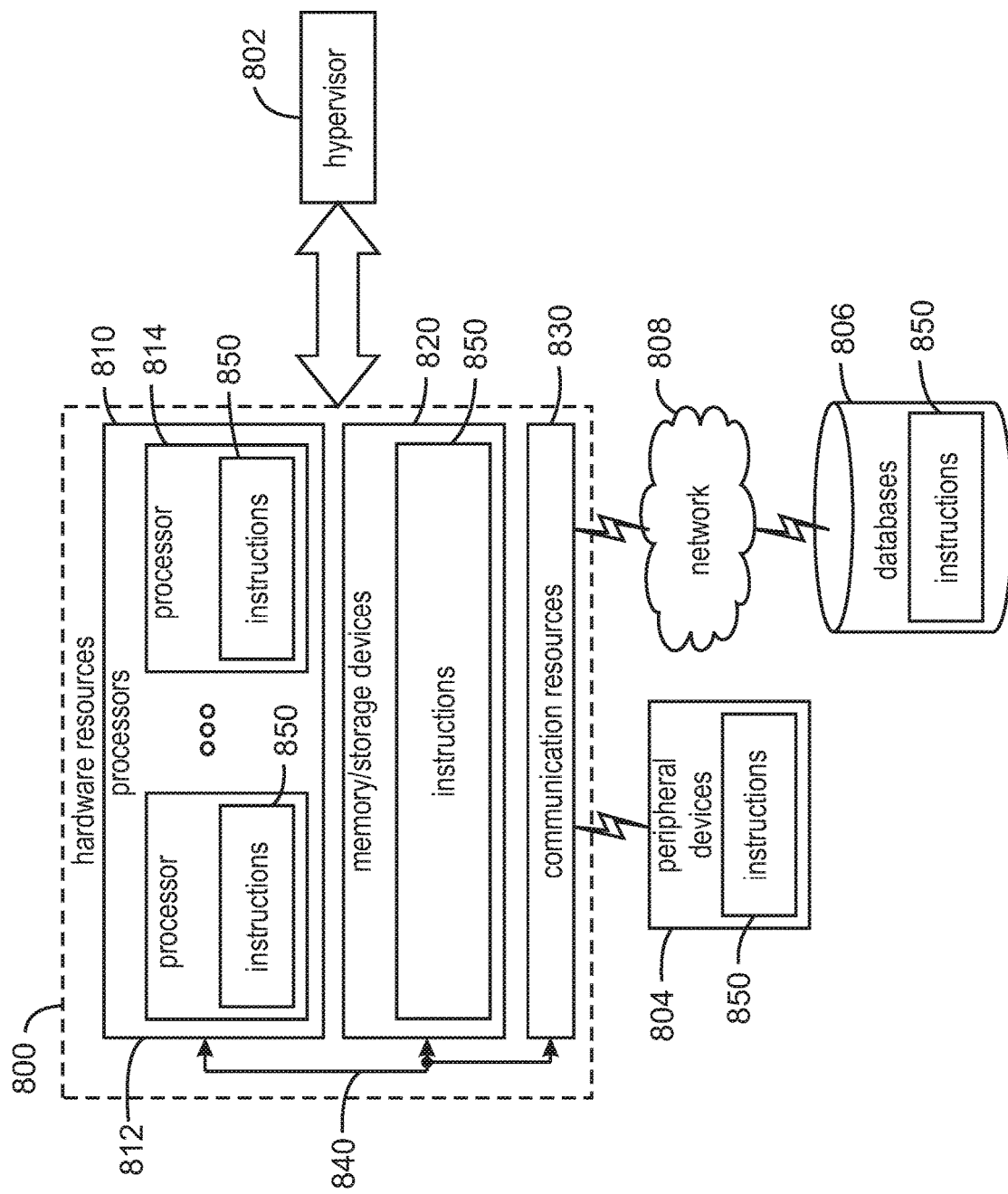
FIG. 8 is a block diagram illustrating components able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

FIGS. 9A-9D are flow diagrams of scrambling sequence generation method 900A-900D, respectively (collectively, "scrambling sequence generation method 900"), according to some embodiments. The scrambling sequence generation method 900 may be implemented as part of a UE, such as the UE 101, or in a gNB such as the macro RAN node 111 of the RAN 110 operating in a cellular environment such as the system 100 (FIG. 1). The scrambling sequence generation method 900 uses one or more parameters to generate initial seed value formulas used to generate scrambling sequences for reference signals (900A), data (900B), DL control channels (900C), and UL control channels (900D). Reference signals include Demodulation Reference Signals (DM-RS), Channel State Information (CSI) Reference Signals (CSI-RS), and Phase Tracking Reference Signals (PT-RS). Data channels includes the PDSCH and physical uplink shared channel (PUSCH). DL control channels include PDCCH and EPDCCH. UL control channels include the physical uplink control channel (PUCCH).

Figure 9A:
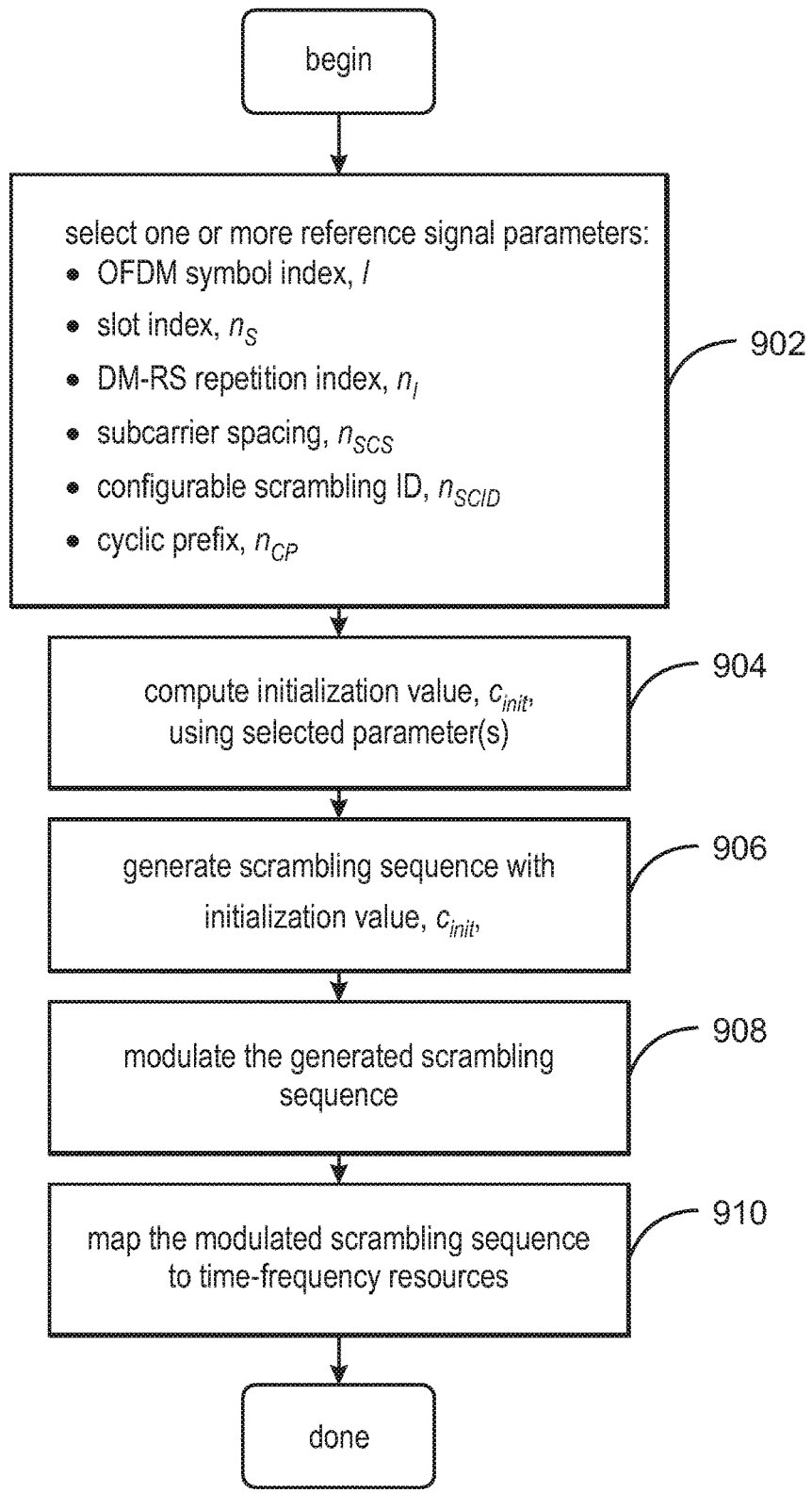
FIGS. 9A-9D are flow diagrams illustrating a scrambling sequence generation method, according to some embodiments.

FIG. 9A illustrates a process flow for scrambling sequence generation for reference signals, according to some embodiments. The flow diagram 900A commences by retrieving, such as by a baseband processor of the UE or gNB, one or more reference signal parameters for computing the initialization value, $c_{init}$ (block 902). The one or more parameters may be stored in a memory, such as the memory 304G of FIG. 3. The initialization value is then computed (block 904) and, from the computed $c_{init}$, a scrambling sequence is generated (block 906). For reference signals, the generated scrambling code is modulated (block 908) and mapped to time-frequency resources (block 910). The mapped resources may be sent to an RF interface such as illustrated in FIG. 3 before being sent over air to a remote receiver.

Figure 9B:
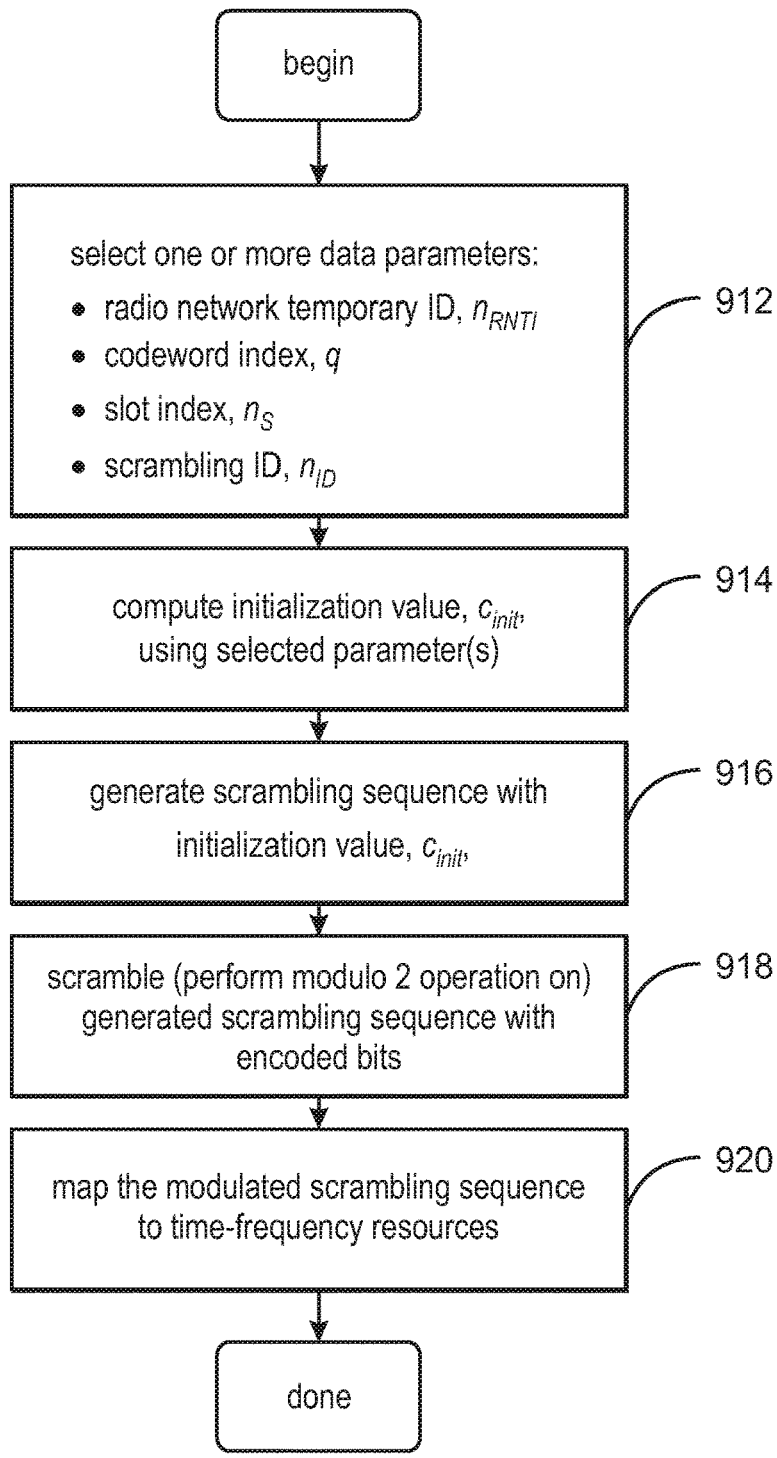
Figure 11:
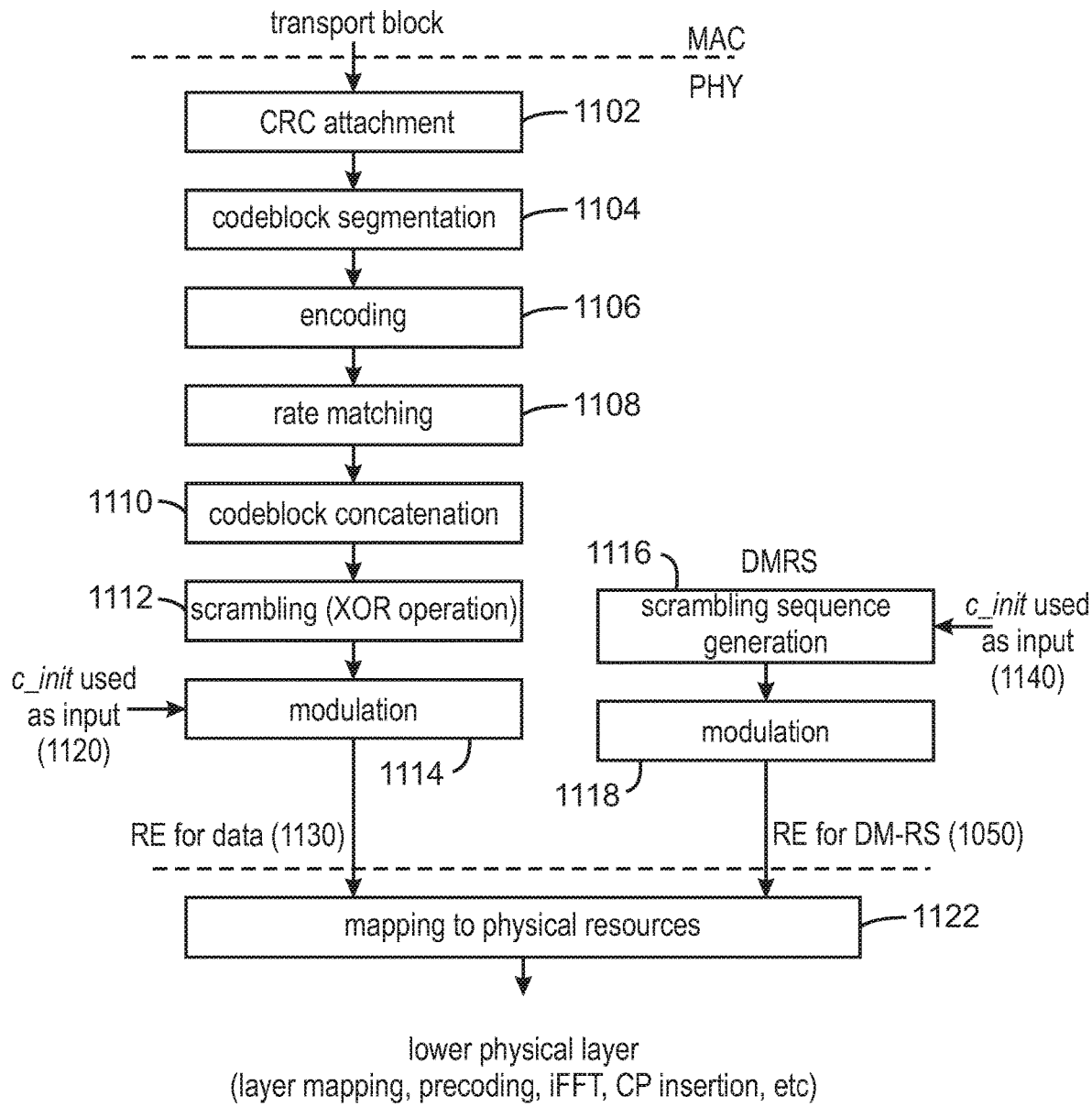
FIG. 11 is a simplified signal generation procedure in New Radio, according to some embodiments.

FIG. 9B illustrates a process flow for scrambling sequence generation for data transmission, according to some embodiments. The flow diagram 900B commences by retrieving one or more data parameters for computing the initialization value, $c_{init}$ (block 912). As is illustrated in FIG. 11, below, the $c_{init}$ used for scrambling sequence generation for data is different from the $c_{init}$ used for reference signals. The initialization value is computed (block 914) and, from the computed $c_{init}$, a scrambling sequence is generated (block 916). Next, a modulo 2 addition of the generated scrambling sequence and encoded bits is performed (block 918). A modulo 2 addition is mathematically the same as performing an exclusive-OR (XOR) operation. The modulated scrambling sequence is then mapped to time-frequency resources (block 920) and transmitted over air to a receiving device.

Figure 9C:
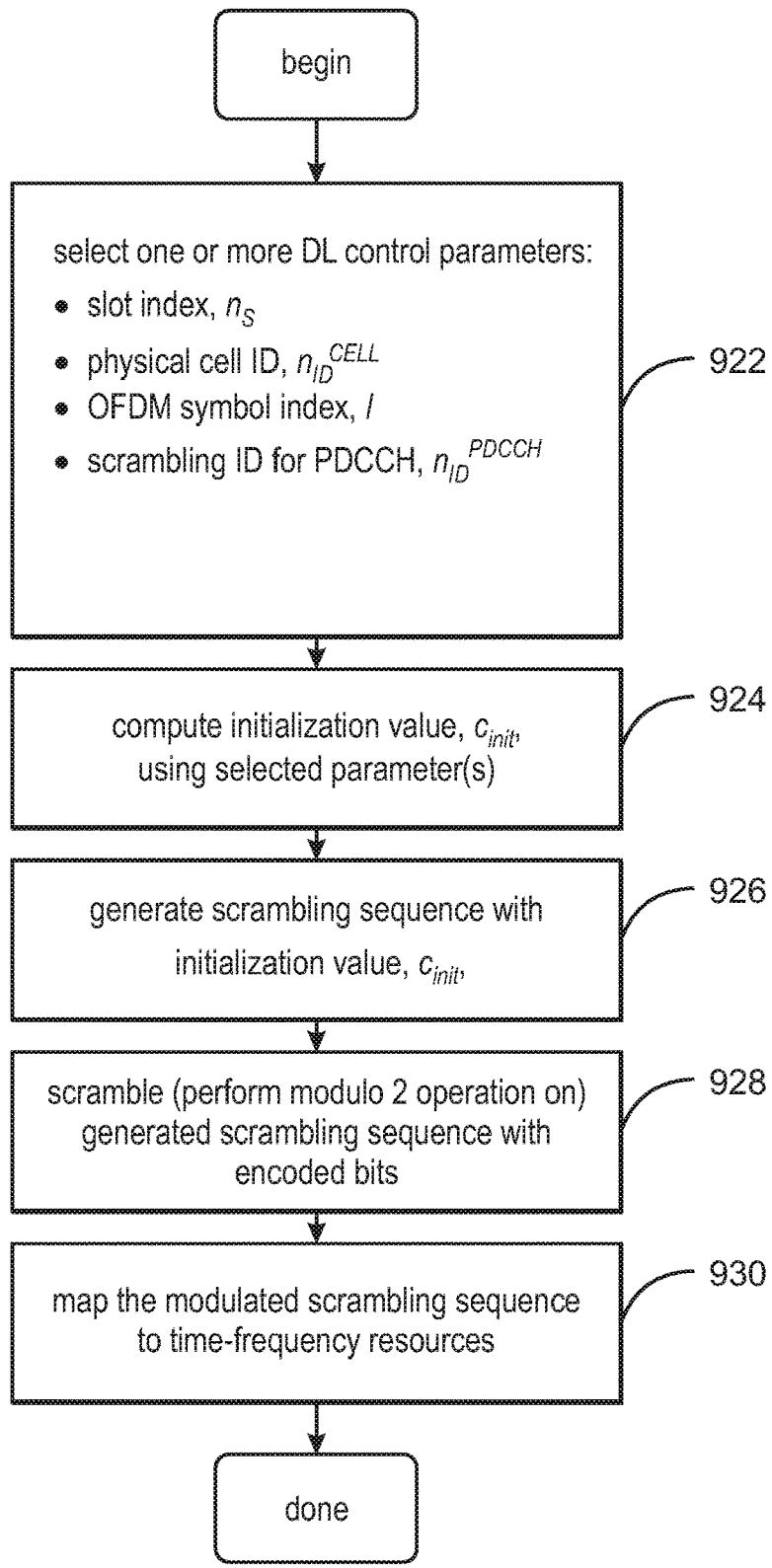

FIG. 9C illustrates a process flow for scrambling sequence generation for downlink control, according to some embodiments. The flow diagram 900C commences by selecting one or more downlink control parameters (block 922). Using the selected parameter(s), the initialization value $c_{init}$ is computed (block 924) and a scrambling sequence is generated using the initialization value (block 926). As with the data transmission operations 900B, for the downlink control parameters, a modulo 2 addition of the generated scrambling sequence and encoded bits is performed (block 928), with the modulated scrambling sequence being mapped to time-frequency resources (block 930).

Figure 9D:
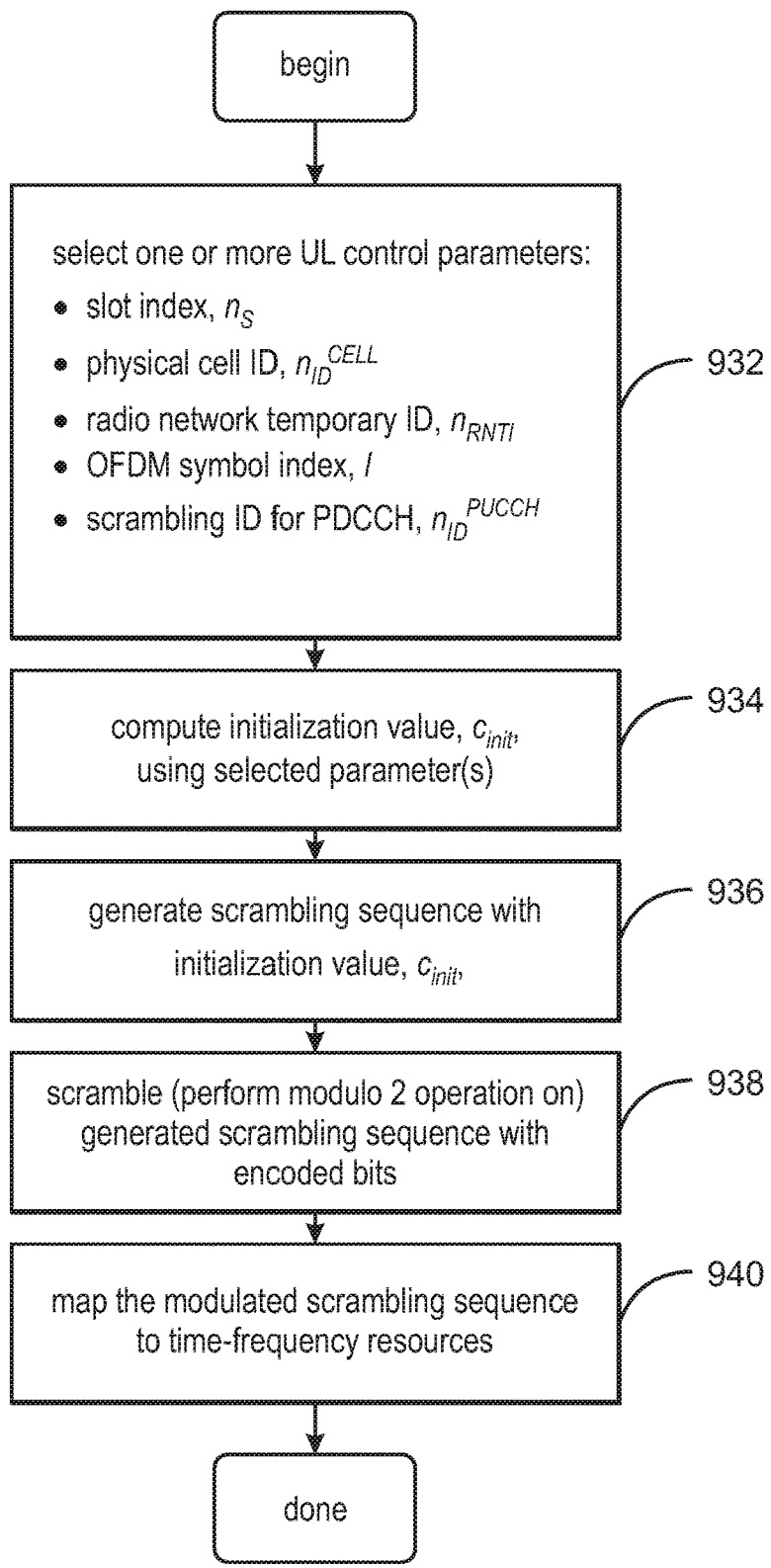

FIG. 9D illustrates a process flow for scrambling sequence generation 900D for uplink control, according to some embodiments. One or more uplink control parameters is selected (block 932), with which the initialization value $c_{init}$ is computed (block 934), with a scrambling sequence being generated using the initialization value (block 936). A modulo 2 addition of the generated scrambling sequence and encoded bits is performed (block 938), with the modulated scrambling sequence being mapped to time-frequency resources (block 940).

For the above operations 900A, 900B, 900C, and 900D, where the operations are performed by a UE, the receiving device may be another UE or a gNB. When the operations are performed by a gNB, the receiving device may be one or more UEs.

Table 1 is a list of parameters used by the scrambling sequence generation method 900, according to some embodiments. These parameters are discussed in the following pages.

TABLE 1

Parameters used in generating initial seed value, $c_{init}$

| symbol | name | range |
|---|---|---|
| $n_s$ | slot index | $0 \ldots 10^\mu - 1, \mu = 0, 1, 2, 3$ |
| $n_{ID}$ | virtual cell ID for DM-RS | $0 \ldots (2^{16} - 1)$ |
| $n_{SCID}$ | scrambling ID | 0, 1 |
| $n_I$ | DM-RS repetition index | $\{0, 1, 2\}$. $\{0, 1, 2\}$ or $\{0, 1, 2, 3\}$ |
| $n_{SCS}$ | subcarrier spacing | 0, 1, 2, 3 |
| $n_{CP}$ | cyclic prefix | 0, 1 (normal or extended CP) |
| $n_{ID}^{CSI}$ | virtual cell ID for CSI-RS | $0 \ldots (2^{10} - 1)$ |
| q | codeword index | 1, 2 |
| $n_{RNTI}$ | radio network temporary ID | $0 \ldots 2^{16} - 1$ |
| $N_{ID}^{cell}$ | physical cell ID | $0 \ldots 1007$ |
| $N_{ID}^{data}$ | scrambling ID for data | $0 \ldots 2^{10} - 1$ |
| l | OFDM symbol index | 0 . . . 13 for normal CP |
| | | 0 . . . 11 for extended CP |
| $N_s$ | # symbols/slot | 14 |
| $N_{ID,m}^{PDGGH}$ | scrambling ID for PDCCH $m^{th}$ CORESET | $0 \ldots 65535$ |
| $N_{ID}^{PUCCH}$ | scrambling ID for PUCCH | $0 \ldots 1023$ |

New Radio (NR) is distinguishable from the Long-Term Evolution (LTE) standard in many ways. For LTE, the subcarrier spacing is 15 kHz. For NR, the subcarrier spacing is scalable, according to parameter, µ, with subcarrier spacing given by $2^\mu*15$ kHz, with µ of 0, . . . , 4, allowing for subcarrier spacing of 15, 30, 60, 120, and 240 kHz, respectively. The flexibility of NR allows for high reliability use cases as well as low latency use cases. For example, data transmissions below 6 GHz use 15, 30, or 60 kHz subcarrier spacing, while data transmissions above 6 GHz use 60 or 120 kHz subcarrier spacing.

Figure 10A:
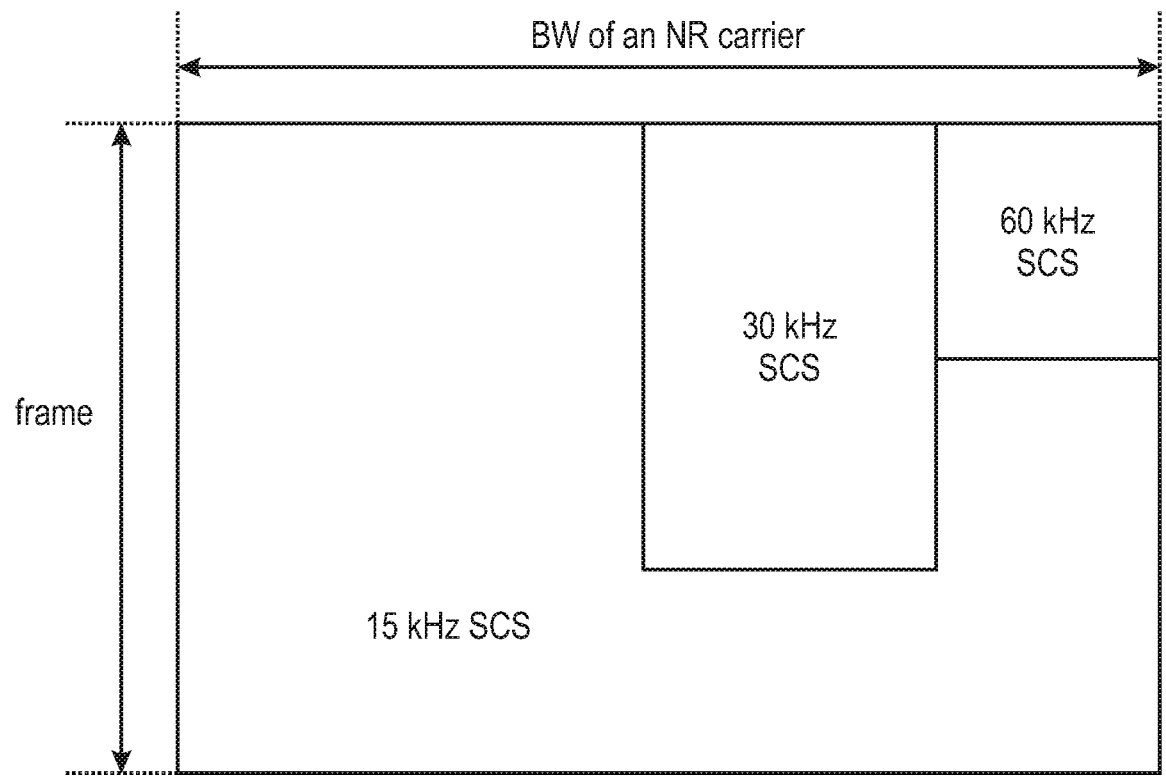
FIGS. 10A and 10B are illustrations of variable subcarrier spacing in New Radio, according to some embodiments.
Figure 10B:
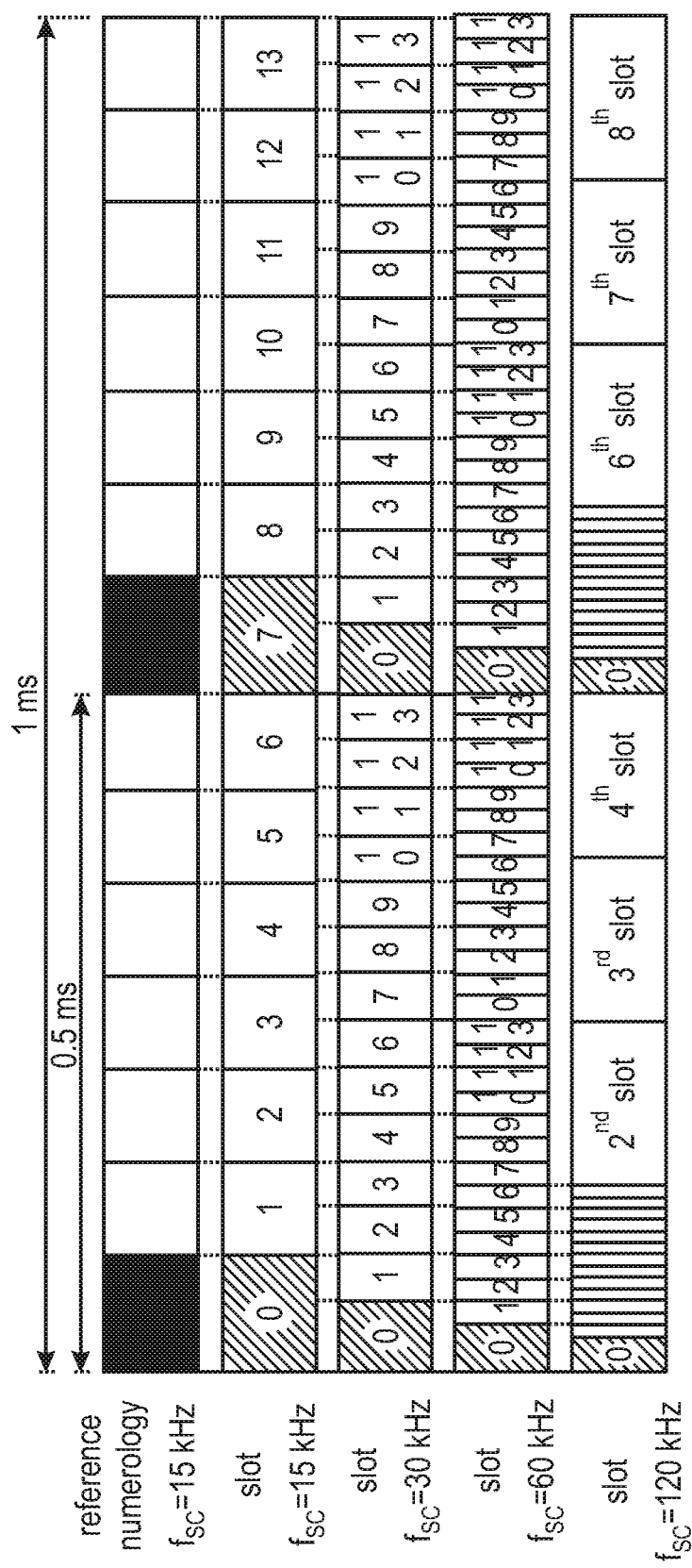

FIGS. 10A and 10B provide example configurations under NR. FIG. 10A shows the variable subcarrier spacing from the perspective of the network. Subcarrier spacings of 15 kHz, 30 kHz, and 60 kHz simultaneously occupy a single radio frame. FIG. 10B illustrates how the width of a slot varies according to the subcarrier spacing. Each symbol length (including CP) of 15 kHz equals the sum of the corresponding $2^\mu$ symbols at the carrier frequency. Thus, 15 kHz transmissions have 14 symbols per subframe with 1 ms duration while 30 kHz transmissions have 28 symbols per subframe, 60 kHz transmissions have 56 symbols per subframe, and 120 kHz transmissions have 112 symbols per subframe. The number of slots in a subframe changes with the subcarrier spacing: slot length=1 ms/$2^\mu$. At 15 kHz, the number of slots in a 1 ms subframe is 1, at 30 kHz, the number of slots is 2, at 60 kHz, the number of slots is 4; at 120 kHz, the number of slots is 8.

The flexibility of NR allows for high reliability use cases as well as low latency use cases. For example, data transmissions below 6 GHz use 15, 30, or 60 kHz subcarrier spacing, while data transmissions above 6 GHz use 60 or 120 kHz subcarrier spacing.

Under NR, two parameters of the radio subframe, subcarrier spacing and cyclic prefix, are known as the numerology of the subframe. In some embodiments, the scrambling sequence generation method 100 considers the numerology in generating the initial seed value.

Reference Signals

Downlink reference signals are used in LTE for different purposes and consist of multiple reference symbols occupying specific resource elements (also known herein as time-frequency resources) within the radio frame. Terminals (UEs) use cell-specific reference signals (CRS) for channel estimation for coherent demodulation of downlink physical channels. CRS are also used for obtaining Channel State Information (CSI), for cell selection and for handover.

Under LTE-A, reference signals are defined to split up the channel estimation and CSI acquisition operations. Demodulation reference signals (DM-RS) are used for channel estimation and CSI reference signals (CSI-RS) are used to acquire channel state information. DM-RS are higher-density on the radio frame than CSI-RS and are transmitted when there is data to transmit, while CSI-RS occur with less frequency than DM-RS. CSI-RS are more efficient than CRS for deriving CSI for multiple network nodes and antenna ports.

Also known as UE-specific reference signals, DM-RS are used for channel estimation for coherent demodulation of one or more physical channels, for example, the PDSCH and the EPDCCH. A predefined DM-RS is designated for each UE, enabling the UE to perform channel estimation. DM-RS are transmitted within the resource block specifically assigned for PDCCH/EPDCCH transmission to a given terminal.

Introduced in LTE Release 10, CSI-RS are used by terminals to acquire CSI, which consists of Channel Quality Indicator (CQI), Precoding Matrix Indicator (PMI), Precoding Type Indicator (PTI), and Rank Indicator (RI). CSI-RS symbols making up the CSI-RS signal are transmitted in every resource block of the frequency domain. In the time domain, CSI-RS can be transmitted with different periodicity, such as every 5 ms (twice a frame), every 1 ms (every frame), and so on up to every eighth frame (80 ms).

The antenna ports used for CSI-RS are different than those corresponding to DM-RS. CSI-RS antenna ports typically correspond to actual transmit antennas while DM-RS antenna ports may include antenna precoding at the eNB. Despite the fact that the DM-RS occupy different antenna ports than the CSI-RS, interference between them can still occur.

In New Radio (NR), there is a new type of reference signal, the Phase Tracking Reference Signal (PT-RS), which tracks the phase over time for the received signal. In some embodiments, PT-RS is used for millimeter wave systems and the PT-RS reference signals have a higher density in the time domain compared to DM-RS. Because the phase of the signal may change quickly, PT-RS may be present, for example, in every OFDM symbol, every second OFDM symbol, or every fourth OFDM symbol.

Physical Channels

LTE and NR utilize physical channels for transmitting data and reference signals. In the downlink, the physical channels include the Physical Broadcast Channel (PBCH), the PDCCH, the EPDCCH, and the PDSCH. In the uplink, the physical channels include the PUCCH, the PUSCH, and the Physical Random Access Channel (PRACH).

In NR, the DM-RS in PDSCH can be front-loaded (occupying 1 or 2 OFDM symbols). PDSCH can be transmitted in two ways, either using slot-based or non-slot-based scheduling. In contrast to LTE, a transmission of data does not have to start at the beginning of the slot but can start at the second symbol and end at the third symbol of the slot which, in this example, is a one-symbol transmission. This is a type of non-slot-based transmission. Additional DM-RS symbols can be configured, such as for high-speed scenarios. Similarly, front-loaded PUSCH DM-RS (occupying 1 or 2 OFDM symbols) are located at first OFDM symbols assigned for PUSCH, with additional DM-RS symbols being configurable, such as for high-speed scenario.

QPSK Modulation

Along with the data, reference signals and control channels are modulated before transmission, such as by quadrature phase shift keying (QPSK) modulated. QPSK modulation ensures that the Peak-to-Average Power Ratio (PAPR) of the transmitted waveform is kept low. QPSK modulation takes place once a random sequence is generated as input. A simplified signal generation flow diagram 1100 is illustrated in FIG. 11, according to some embodiments. The flow diagram 1100 illustrates two different paths, one for data and control signals and the other for reference signals. For data and control signals, in the physical layer (PHY), cyclic redundancy check (CRC) attachment (1102), codeblock segmentation (1104), encoding (1106), rate matching (1108), and codeblock concatenation (1110) take place. These operations are beyond the scope of this disclosure. Scrambling operations (1112) are then performed, as described in FIGS. 9B, 9C, and 9D, above, in which a modulo 2 addition (XOR operation) between the scrambling sequence and encoded bits is performed. This is followed by a modulation (1114) in which an initial seed value, $c_{init}$ (1120), is used for the modulation. The resulting resource elements (REs) for data (1130) are mapped to physical resources (1122). At the lower physical layer, operations such as layer mapping, precoding, inverse Fast Fourier Transform (iFFT), and cyclic prefix insertion are performed.

Also shown in the flow diagram 1100 is a distinct path for the modulation of reference signals, according to some embodiments. The reference signals, such as DM-RS, also involve an initial seed value, $c_{init}$, in their generation, but this initial seed value (1140) is different from the one (1120) used for data transmission. The initialization value $c_{init}$, is used to generate a scrambling sequence (1116), and the generated scrambling sequence is then modulated (1118), resulting in a RE for reference signals (1050), such as DM-RS. Like the data REs 1130, the reference signal REs 1050 are mapped to physical resources 1124, and the lower physical layer operations are performed on all REs at this stage.

Pseudo-random noise (PN) sequences are made up of 1s and 0s that are supposed to be random. A PN sequence generator may comprise linear feedback shift registers (LSFR) to generate the PN sequences. Scrambling codes used in LTE and NR are based on Gold codes, which are obtained by combining two PN sequences and performing modulo-2 addition or performing an exclusive OR (XOR) operation on them. The resulting scrambling codes have many properties, such as cross-correlation, and are utilized for different operations under 3GPP.

Under LTE, the scrambling unit or random number/sequence generator used for QPSK modulation uses a pseudo-random Gold sequence, c(n), which is obtained by combining two M-sequences, $x_1$ and $x_2$, of length 31, as described in TS 36.211. The output sequence c(n) of length $M_{PN}$, where n=0,1, ..., $M_{PN}-1$, is defined by:

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad (1)$$

where Nc is an initial offset ($N_c=1600$) and the first m-sequence is initialized with $x_1(0)=1$, $x_1(n)=0$, n=1,2, ..., 30. Thus, the first term, $x_1(0)$ has a value of 1 while the other 30 terms ($x_1(1), x_1(2), \ldots, x_1(30)$) have a value of 0.

The initialization of the second m-sequence is denoted by $c_{init}=\Sigma_{i=0}^{30} x_2(i) \cdot 2^i$ with $c_{init}$ being the initial seed value, with the value depending on the application of the sequence. $c_{init}=x_2(0)*2^0+x_2(1)*2^1+x_2(2)*2^2+x_2(3)*2^3+x_2(4)*2^4+x_2(5)*2^5$, and so on.

The second m-sequence thus is a sum of 31 components, given by $x_2(i)$, and represented in binary form.

Initial Seed Value for Reference Signals

In some embodiments, the initial value, $c_{init}$, depends on the type of reference signal as well as one or more parameters related to the reference signal. In some embodiments, the random number/sequence produced by the random number/sequence generator is generated at the start of each subframe. Therefore, within a single subframe, the initial seed value, $c_{init}$, and thus the random number/sequence, does not change.

For example, under LTE, for demodulation reference signal (DM-RS) antenna ports 7-13, the initial seed value, $c_{init}$, is given by:

$$c_{init}=(\lfloor n_s/2 \rfloor+1) \cdot (2n_{ID}^{(nSCID)}+1) \cdot 2^{16}+n_{SCID} \quad (2)$$

at the start of each subframe, where $n_s$ is the slot index 0 ... 19, $n_{SCID}$ is the scrambling identity indicated by downlink control information (DCI), and the quantities, $n_{ID}^{(i)}$, i=0,1, are given by:

$$n_{ID}^{(i)}=N_{ID}^{cell} \text{ in case there is no configuration} \quad (2a)$$

$$n_{ID}^{(i)}=n_{ID}^{DMRS,i} \text{ otherwise} \quad (2b)$$

The first parameter of the initial seed value calculation, the slot index, $n_s$, is part of a floor function (which takes as input a real number, x, and gives as output the greatest integer less than or equal to x). The first slot of a first subframe would have slot index, $n_s$, of 0 and the second slot of the first frame would have a slot index of 1. By dividing the slot index by 2, taking the floor, and adding one, this means that slots 0 and 1 will get the same result, 1, slots 2 and 3 will get the same result, 2, and so on. Thus, the first part of equation 2 ensures that both slots of a subframe will get the same initial seed value. In other words, the initial seed value, $c_{init}$, is changing every LTE subframe, rather than every slot.

The second parameter of equation 2, $n_{ID}$, is calculated using equations 2a and 2b. The $n_{ID}$ term is the virtual cell ID and is equal to the physical cell ID, given by $n_{ID}^{cell}$, if the network has not configured the UE with an ID. If, instead, the network has configured the UE with an ID, then the $n_{ID}$ term is equal to $n_{ID}^{DM-RS,i}$. The parameter, $n_{ID}$, can take a large range of values.

The third parameter of equation (2), $n_{SCID}$, is the scrambling identifier. The scrambling identifier, $n_{SCID}$, is indicated by a downlink control information (DCI) message transmitted through the PDCCH, and has a value of either 0 or 1.

Equation 2 is used for DM-RS for antenna ports 7-13 under LTE. Equation 2 thus illustrates one mechanism by which the initial seed value, $c_{init}$, may be based on parameters, the slot index, $n_s$, the UE ID, $n_{ID}$, and the scrambling ID, $n_{SCID}$.

Under LTE and NR, different cells operate in the same frequency bands. And, the reference signals in the different cells may collide with one another. Thus, to randomize interference from one cell to the next, the random number/sequence generator uses different random sequences for different cells. Thus, each cell or base station is using its unique sequence to modulate DM-RS or other reference signals.

The existing approach for initial seed value determination considers parameters supported by LTE for reference signal determination. For new radio (NR), due to the support of different subcarrier spacing, different scheduling options (such as slot and non-slot-based scheduling), there exist other parameters not available under LTE. In some embodiments, these NR-specific parameters are used to generate the initial seed value.

Table 2 is a list of parameters, along with their possible use in generating initial seed values for three types of reference signals. Some of these parameters are available in both LTE and NR, while others are available in NR but not LTE.

TABLE 2

Parameters for initial seed value, $c_{init}$, for some reference signals

| parameter | DM-RS | CSI-RS | PT-RS |
|---|---|---|---|
| 1) DM-RS repetition index, $n_I$ | yes | no | no |
| 2) subcarrier spacing, $n_{SCS}$ | yes | yes | yes |
| 3) configurable scrambling ID, $n_{ID}^{DM-RS,J}$, $N_{ID}^{CSI}$ | yes | yes | yes |
| 4) OFDM symbol number, I | yes* | yes | yes |
| 5) CP duration, $n_{CP}$ | yes | yes | yes |
| 6) PT-RS port number, p_j | no | no | yes |

*for non-slot-based scheduling

These parameters are discussed in conjunction with the three reference signals.

Calculating Initial Seed Value for DM-RS

As shown in Table 2, in some embodiments, the initial seed value, $c_{init}$, for the DM-RS is based on one or more of the following parameters: DM-RS repetition index, subcarrier spacing, configurable scrambling ID, OFDM symbol, and cyclic prefix duration. In contrast to the CSI and phase tracking reference signals, the demodulation reference signals are transmitted with PDSCH.

The first parameter, DM-RS repetition index, is a value based on the arrangement of DM-RS in the slot. In NR, a slot may, for example, have two, three or four instances of DM-RS repetition. The first DM-RS may be in the first symbol. This would be the front-loaded DM-RS. Because an interfering cell may use the same DM-RS configuration, DM-RS from the serving cell may collide with DM-RS of the interfering cell. To improve channel estimation performance in such scenarios, it may be helpful to randomize succeeding DM-RS differently than the first one. Thus, to provide additional randomization between a front-loaded DM-RS symbol and DM-RS symbol repetition in an NR slot, the initial seed value, $c_{init}$, depends on the index of DM-RS repetition, in one embodiment.

For example, the parameter, $n_i$, known herein as the DM-RS loading parameter or DM-RS repetition index, can be introduced in the calculation of the initial seed value. In one embodiment, $n_i$ takes one value from the set $\{0, 1\}$, depending whether the DM-RS symbol corresponds to the front-loaded part of DM-RS transmission (the first DM-RS symbol) or repetition of DM-RS symbols. Suppose, for example, that a first DM-RS is located in OFDM symbol 3. The DM-RS loading parameter, $n_i$, may be 0 while for all other DM-RS in the slot, $n_i$ is 1. In another embodiment, the front-loaded part of DM-RS transmission is defined as the first three DM-RS symbols. For those symbols, $n_i$ is assigned a 0 value while, for the remaining DM-RS symbols, the parameter, $n_i$, is assigned a 1 value. This ensures that the initial seed value, and thus the random number/sequence, is different for the first DM-RS symbol (or maybe the first three DM-RS symbols) than for the remaining DM-RS symbols. In another embodiment, for DM-RS repetition in OFDM symbols 6, 9, and 12, the DM-RS repetition parameter, $n_i$, is assigned 1, 2, and 3, respectively.

In some embodiments, subcarrier spacing is another parameter used to calculate an initial seed value for DM-RS, so as to further randomize interference between DM-RS symbols. The subcarrier spacing parameter, $n_{SCS}$, may be part of calculating the initial seed value. For example, $n_{SCS}=0$, 1, 2 or 3 can be used for subcarrier spacing of 15 kHz, 30 kHz, 60 kHz and 120 kHz, respectively, irrespective of the cyclic prefix duration.

In another embodiment, the OFDM symbol index I in the slot corresponding to DM-RS symbol transmission can be used. This parameter, I, is also known as the time domain instance of the reference signal transmission because the OFDM symbol index indicates the position of the reference signal in the time domain. For example, if DM-RS is transmitted in the $3^{rd}$, $6^{th}$, $9^{th}$ and $12^{th}$ OFDM symbols, the corresponding OFDM symbol indexes, 3, 6, 9, and 12, respectively, are used to calculate the initial seed.

In another embodiment, an index of the slot, denoted as $n_s$, is used to determine the initial seed value. This would ensure that different slots of the same subframe would be modulated based on a different random number/sequence. For mini-slot scheduling, the value of the slot index, $n_s$, can be selected in accordance with the starting OFDM symbol of the physical downlink shared channel/physical uplink shared channel (PDSCH/PUSCH) transmission.

In another embodiment, a virtual channel identification (VCID), denoted as $n_{ID}$, is used to determine the initial seed value. The VCID can have values between 0 and 65,535. In another embodiment, a special parameter indicating cyclic prefix duration, $n_{CP}$, is used to determine the initial seed value of the pseudo-random number/sequence. For example, $n_{CP}=0$, for normal CP duration and $n_{CP}=1$, for extended CP duration.

Based on the above parameters, the initial seed value, $c_{init}$, can be represented as follows:

$$c_{init}=(n_i+1)\cdot(n_s+1)\cdot(2n_{ID}+1)\cdot 2^6+n_{SCS}\cdot 2^2+n_{SCID}\cdot 2+n_{CP} \quad (3)$$

where $n_i$ is the DM-RS repetition index, $n_s$ is the slot index, $n_{ID}$ is the virtual channel ID (VCID), $n_{SCS}$ is the subcarrier spacing parameter (0, 1, 2, or 3), $n_{SCID}$ is the scrambling ID (0 or 1), and $n_{CP}$ is the cyclic prefix duration (0 or 1). Equation 3 thus utilizes numerology in generating the scrambling sequence for DM-RS, in some embodiments.

Calculating Initial Seed Value for CSI-RS

The Channel State Information Reference Signal (CSI-RS) is used by the UE to estimate the channel and report Channel Quality Information (CQI) to the base station (eNB). In some embodiments, the initial seed value, $c_{init}$, for CSI-RS is given by the following equation:

$$c_{init}=2^{13}\cdot(7\cdot(n_s+1)+l+1)\cdot(2\cdot n_{ID}^{CSI}+1)+2^2\cdot n_{SCS}+ 2\cdot n_{ID}^{CSI}+n_{CP} \quad (4)$$

where $n_s$ is the slot index, $n_{ID}$ is the virtual CSI-RS ID (VCID), $n_{SCS}$ is the subcarrier spacing parameter (0, 1, 2, or 3), $n_{ID}^{CSI}$ is the CSI ID, and $n_{CP}$ is the cyclic prefix duration (0 or 1).

In some embodiments, when CSI-RS is configured for beam management, the initial seed value, $c_{init}$, does not depend on the OFDM symbol number. In particular, for CSI-RS resource symbols in a given CSI-RS resource set, the same scrambling sequence is used, in some embodiments. In another embodiment, the same scrambling sequence for all OFDM symbols of the CSI-RS resource set is used when CSI-RS repetition is set to "OFF". In other embodiments, the same scrambling sequence for all OFDM symbols of the CSI-RS resource set is used when CSI-RS repetition is set to "ON". In additional embodiments, high layer signaling disables time domain parameter(s), such as $n_s$ and I, in the equation for $c_{init}$. Equation 4 utilizes numerology in generating the scrambling sequence for CSI-RS, in some embodiments.

Calculating Initial Seed Value for Phase-Tracking Reference Signals (PT-RS)

In some embodiments, for PT-RS, the scrambling seed value is dependent on one or more of subcarrier spacing, $n_{SCS}$, PT-RS port number, the configurable scrambling ID, $n_{SCID}$, the OFDM symbol number, I, and the CP duration, $n_{CP}$.

Calculating Initial Seed Value for Data (PDSCH and PUSCH)

In some embodiments, for PDSCH and PUSCH in LTE, the scrambling sequence is defined as a function of the slot index, the physical cell ID, the Radio Network Temporary Identifier (RNTI), and the codeword index, which can help in randomizing interference between different cells, user equipment (UEs), and codewords. If a UE occupies a cell serviced by the gNB, that UE would have a physical cell ID and a temporary ID, the RNTI. If several UEs occupy the same cell, they would share the physical cell ID, but each UE would have its own RNTI.

Using these parameters, in some embodiments, the scrambling sequence generator is initialized as:

$$c_{init} = n_{RNTI} \cdot 2^{14} + q \cdot 2^{13} + \lfloor n_s/2 \rfloor \cdot 2^9 + N_{ID}^{cell} \quad (5)$$

where $n_{RNTI}$ is the RNTI associated with PDSCH or PUSCH transmission, q is the codeword index, $n_s$ is the slot index, and $N_{ID}^{cell}$ is the physical cell ID.

In a downlink transmission for NR, two codewords can be transmitted at the same time in one PDSCH. These two independent transport blocks are referenced by the codeword index, q.

As agreed in NR, data transmission can have a minimum duration of one symbol and can start at any OFDM symbol. In some embodiments, the scrambling sequence generation provides finer granularity by further randomizing the interference to within one slot.

In addition to the above embodiments for reference signals, the scrambling sequence generation method 900 (FIG. 9) also enables:

1) scrambling sequence generation for the data channel (FIG. 9B)
2) scrambling sequence generation for DL control channel (FIG. 9C)
3) scrambling sequence generation for UL control channel (FIG. 9D)

Scrambling Sequence Generation for Data Transmission

In NR, a bandwidth part consists of a group of contiguous Physical Resource Blocks (PRBs). Each bandwidth part has its own numerology (cyclic prefix and subcarrier spacing). An initial bandwidth part is signaled by the PBCH. It contains CORESET and PDSCH for Remaining Minimum System Information (RMSI).

A Control Resource Set (CORESET) is a set of REGs under a given numerology. A resource element group (REG) is one physical resource block (PRB) during one OFDM symbol. The PDCCH CORESET is configured by UE-specific higher layer signaling and includes frequency-domain resources, starting OFDM symbol (0, 1, or 2), and the time duration (up to 3 OFDM symbols).

Figure 12A:
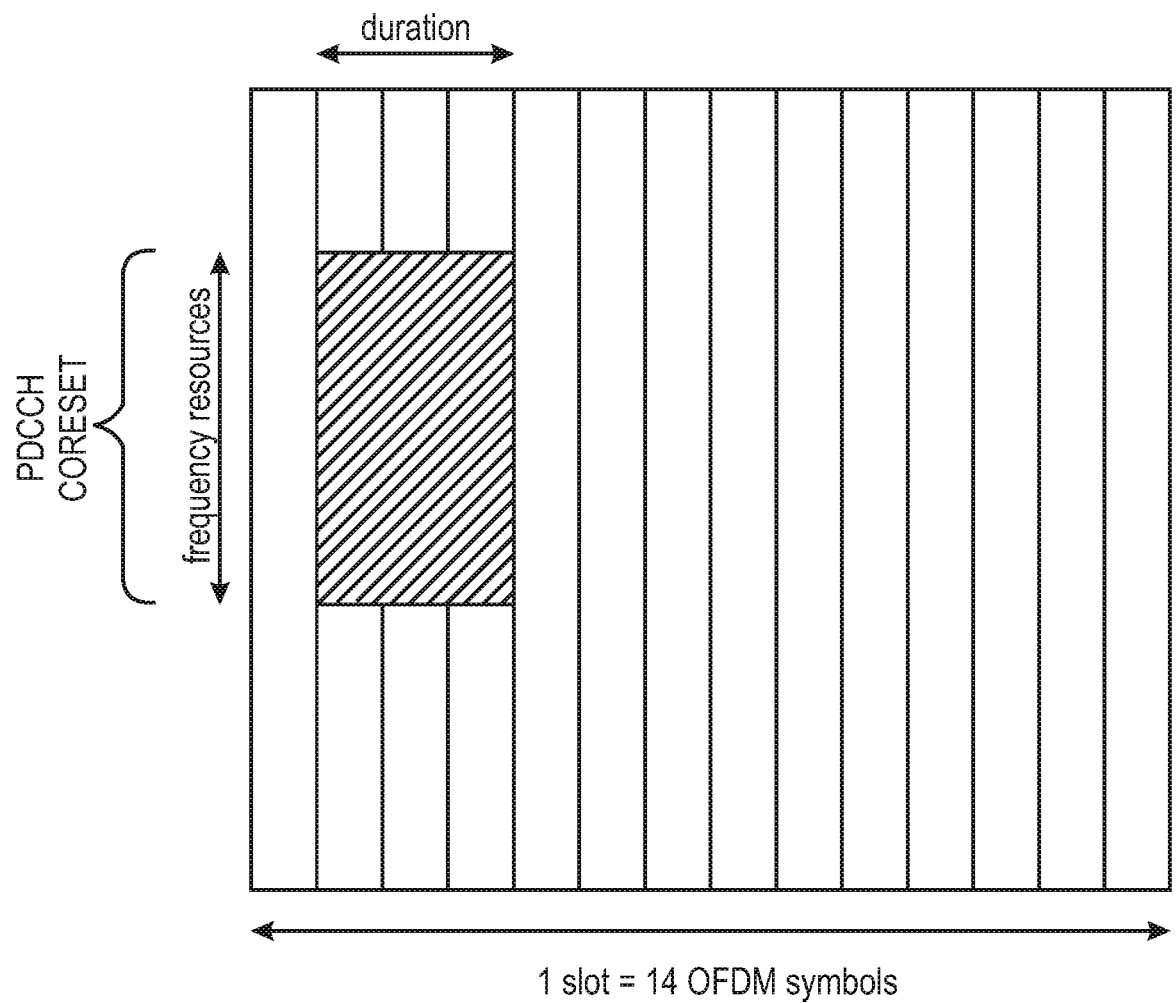
FIGS. 12A and 12B are diagrams illustrating the CORE-SET in New Radio, according to some embodiments.
Figure 12B:
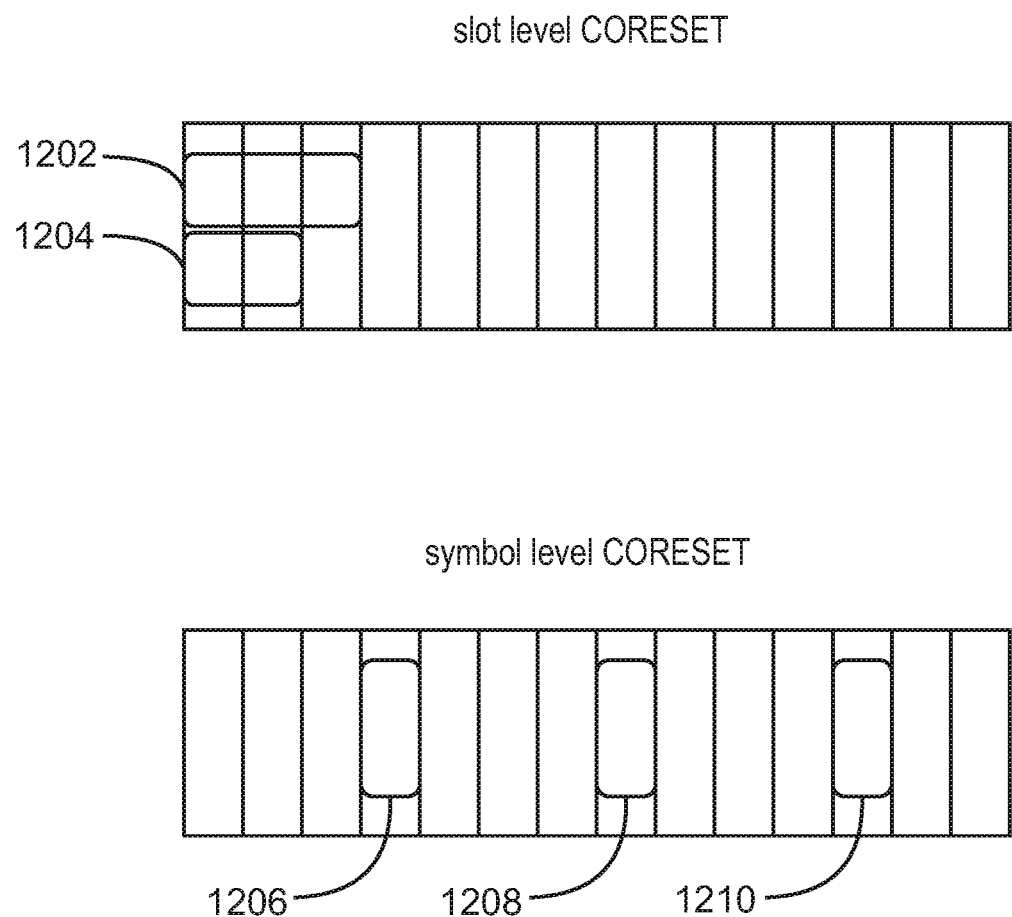

FIGS. 12A and 12B illustrate the CORESET under New Radio, according to some embodiments. In the diagram 1200A (FIG. 12A), a PDCCH CORESET is shown with a duration of 3 OFDM symbols occupying a 14-symbol slot. In FIG. 12B, both slot and symbol level CORESET configurations are shown. Two slot-based CORESETS 402 and 404 are shown, the first occupying a portion of the first three symbols of the slot and the second occupying a portion of the first two symbols. Three symbol-based CORESETS 406, 408, and 410 are shown, each occupying a portion of the $4^{th}$, $8^{th}$ and $12^{th}$ symbols, respectively.

For NR, for slot-based scheduling, a design principle similar to the one defined in LTE, can be applied for the data scrambling. In one embodiment, the scrambling sequence is defined as a function of the slot index, the physical cell ID, the RNTI, and the codeword index. Note that for slot-based scheduling, the slot index may be defined according to the numerology associated with the configured bandwidth part. In one embodiment, the scrambling sequence generator for DL and UL data transmission is initialized as:

$$c_{init} = n_{RNTI} \cdot c_0 + q \cdot c_1 + n_s \cdot c_2 + N_{ID}^{cell} \quad (6)$$

where $c_0$, $c_1$, $c_2$ are constants, such as powers of two, used to position the parameters within certain bit positions.

In another embodiment, the scrambling sequence is defined as a function of slot index, virtual cell ID or scrambling ID, RNTI, and codeword index. In particular, the scrambling sequence generator is initialized as:

$$c_{init} = f(n_{RNTI}, q, n_s, n_{ID}^{data}) \quad (7)$$

where $n_{ID}^{data}$ is the scrambling ID for data transmission. The scrambling ID for data transmission, $n_{ID}^{data}$, is a NR concept and may be configured by higher layers of the gNB by way of the minimum system information (MSI), remaining minimum system information (RMSI), NR system information block (SIB) or radio resource control (RRC) signaling. In one embodiment, the scrambling sequence generator for DL and UL data transmission is initialized as:

$$c_{init} = n_{RNTI} \cdot c_0 + q \cdot c_1 + n_s \cdot c_2 + N_{ID}^{data} \quad (8)$$

Where the scrambling ID for data transmission, $n_{ID}^{data}$, is not available at the UE side, e.g., during initial access, before RRC configuration, and/or during RRC reconfiguration, the default scrambling ID for data transmission may be defined as the physical cell ID, i.e., $n_{ID}^{data} = N_{ID}^{cell}$. Further, the scrambling ID for DL and UL data transmission may be separately configured. Alternatively, a single scrambling ID may be applied for both DL and UL data transmission.

As agreed in NR, for subcarrier spacing up to 60 kHz, the number of symbols within one slot is 7 or 14, while for subcarrier spacing larger than 60 kHz, the number of symbols within one slot is 14. According to this agreement, the number of available slots within one frame is 160. Where a 480 kHz subcarrier spacing is supported, such as in a future release, the number of available slots within one frame may be further extended. For instance, bit-width for the number of slots can be specified as 9 for future proof. In addition, the number of physical cell IDs is increased to 1008 for NR.

In one embodiment, the scrambling sequence generator for DL and UL data transmission is initialized as:

$$c_{init} = n_{RNTI} \cdot 2^{20} + q \cdot 2^{19} + n_s \cdot 2^{10} + N_{ID}^{data} \quad (9)$$

In another embodiment, the scrambling sequence generator for DL and UL data transmission is initialized as:

$$c_{init} = n_{RNTI} \cdot 2^{19} + q \cdot 2^{18} + n_s \cdot 2^{10} + N_{ID}^{data} \quad (10)$$

For NR, the data transmission can have a minimum duration of one symbol and can start at any OFDM symbol. For non-slot-based scheduling, the symbol index can be additionally considered to further randomize the interference within one slot. In one embodiment, the starting symbol index is included in the equation for the scrambling sequence generation for data transmission. Similarly, the starting symbol index may be defined in accordance with the numerology associated with the configured bandwidth part.

In one embodiment, scrambling sequence generator for DL and UL data transmission is initialized as:

$$c_{init} = n_{RNTI} \cdot c_0 + q \cdot c_1 + n_s \cdot c_2 + l \cdot c_3 + N_{ID}^{cell} \quad (11)$$

where $c_0$, $c_1$, $c_2$, $c_3$ are constants, such as powers of two.

In another embodiment, scrambling sequence generator for DL and UL data transmission is initialized as:

$$c_{init} = n_{RNTI} \cdot c_0 + q \cdot c_1 + (N_s \cdot (n_s+1) + l + 1) \cdot c_2 + N_{ID}^{cell} \quad (12)$$

where $N_s$ is the number of symbols within one slot. In NR, $N_s$ may be either 7 or 14, as configured by higher layers. Alternatively, the number of symbols, $N_s$, may be fixed to 14 or 7.

In another embodiment, the scrambling sequence is defined as a function of the slot index, virtual cell ID or scrambling ID, RNTI, the starting symbol for the DL and UL data transmission, and the codeword index. In one option, the scrambling sequence generator for DL and UL data transmission is initialized as:

$$c_{init} = n_{RNTI} \cdot c_0 + q \cdot c_1 + n_s \cdot c_2 + l \cdot c_3 + N_{ID}^{data} \quad (13)$$

In another option, the scrambling sequence generator for DL and UL data transmission is initialized as:

$$c_{init} = n_{RNTI} \cdot c_0 + q \cdot c_1 + (N_s \cdot (n_s+1) + l + 1) \cdot c_2 + N_{ID}^{data} \quad (14)$$

Note that a unified scrambling sequence may be defined for both slot based and non-slot based scheduling. In this case, the above equation may also apply for the slot-based scheduling with l=0.

In another embodiment, the scrambling sequence generator for DL and UL data transmission is initialized as:

$$c_{init}=n_{RNTI}\cdot 2^{24}+q\cdot 2^{23}+n_s\cdot 2^{14}+l\cdot 2^{10}+N_{ID}^{data} \quad (15)$$

In another embodiment, the scrambling sequence generator for DL and UL data transmission is initialized as:

$$c_{init}=n_{RNTI}\cdot 2^{24}+q\cdot 2^{23}+(14\cdot(n_s+1)+l+1)\cdot 2^{10}+N_{ID}^{data} \quad (16)$$

Scrambling Sequence Generation for DL Control Channel

In LTE, the scrambling sequence for the physical downlink control channel (PDCCH) is initialized as:

$$c_{init}=\lfloor n_s/2 \rfloor \cdot 2^9+N_{ID}^{cell} \quad (17)$$

Additionally, for enhanced PDCCH (EPDCCH) in LTE, the scrambling sequence is initialized as:

$$c_{init}=\lfloor n_s/2 \rfloor \cdot 2^9+N_{ID,m}^{EPDCCH} \quad (18)$$

where m is the EPDCCH set number and $N_{ID,m}^{EPDCCH}$ is the EPDCCH ID, which is configured by higher layer in a UE-specific manner.

For NR, the UE can be configured to monitor "DL control channel monitoring" per one symbol with respect to the numerology of the DL control channel. In particular, the UE may be configured with symbol level or slot level control resource set (CORESET) with certain offset/periodicity in one slot for DL control channel monitoring occasions. FIG. 12B illustrates one example of slot- and symbol-level CORESET configuration within a slot. Slot-level CORESET starts at the beginning of the slot while symbol-level CORESET may begin at the beginning of the slot (the first symbol), at the second symbol of the slot, and so on.

From the UE's perspective, the UE will monitor the PDCCH and detect corresponding downlink control information (DCI) within the configured CORESET.

In one embodiment, the scrambling sequence for the DL control channel (PDCCH or EPDCCH) is initialized as a function of at least one or more following parameters: physical or virtual cell ID and slot index. This may apply for the slot level CORESET.

In one embodiment, the scrambling sequence for NR PDCCH is initialized as:

$$c_{init}=n_s\cdot c_0+N_{ID}^{cell} \quad (19)$$

where $c_0$ is predefined in the specification. For instance, $c_0=2^{10}$.

In another embodiment, the scrambling sequence for NR PDCCH is initialized as:

$$c_{init}=n_s\cdot c_0+N_{ID,m}^{PDCCH} \quad (20)$$

where $N_{ID,m}^{PDCCH}$ is the scrambling ID for NR PDCCH for the $m^{th}$ CORESET, which can be configured by higher layers via MSI, RMSI, SIB or RRC signaling. Where the scrambling ID for PDCCH is not available at the UE, $N_{ID,m}^{PDCCH}=N_{ID}^{cell}$.

In another embodiment, the scrambling sequence for the DL control channel is initialized as a function of at least one or more of the following parameters: physical or virtual cell ID (or scrambling ID), starting symbol for CORESET, and slot index. This may apply for the symbol level CORESET.

In one embodiment, the scrambling sequence for NR PDCCH is initialized as:

$$c_{init}=n_s\cdot c_0+l\cdot c_1+N_{ID}^{cell} \quad (21)$$

where $c_0$, $c_1$ are predefined, such as $c_0=2^{14}$ and $c_1=2^{10}$.

In another embodiment, the scrambling sequence NR PDCCH is initialized as:

$$c_{init}=(N_s\cdot(n_s+1)+l+1)\cdot c_0+N_{ID}^{cell} \quad (22)$$

where $N_s$ is the number of symbols within one slot. In NR, $N_s$ may be either 7 or 14, as configured by higher layers. Alternatively, the number of symbols, $N_s$, may be fixed to 14 or 7.

In another embodiment, the scrambling sequence for NR is initialized as:

$$c_{init}=n_s\cdot c_0+l\cdot c_1+N_{ID,m}^{PDCCH} \quad (23)$$

In another embodiment, the scrambling sequence NR PDCCH is initialized as:

$$c_{init}=(N_s\cdot(n_s+1)+l+1)\cdot c_0+N_{ID,m}^{PDCCH} \quad (24)$$

In yet another option, the scrambling sequence for NR is initialized as:

$$c_{init}=n_s\cdot c_0+N_{ID,l}^{PDCCH} \quad (25)$$

where $N_{ID,l}^{PDCCH}$ is the scrambling ID for CORESET with starting symbol l.

A unified scrambling sequence may be defined for both slot level and symbol level CORESET. In this case, the above equation may also apply for the slot level CORESET with l=0.

Scrambling Sequence Generation for UL Control Channel

In LTE, the scrambling sequence for physical uplink control channel (PUCCH) format 2/2a/2b, 3, 4 and 5 is initialized as:

$$c_{init}=(\lfloor n_s/2 \rfloor+1)\cdot(2N_{ID}^{cell}+1)\cdot 2^{16}+n_{RNTI} \quad (26)$$

where $n_{RNTI}$ is the Cell Radio Network Temporary Identifier (C-RNTI).

For NR, both PUCCH with short and long duration are supported. Further, short PUCCH may span one or two symbol(s) while long PUCCH may span any number of symbols from 4 to 14 within a slot. FIG. 13 illustrates one example of NR physical uplink control channel (NR PUCCH) with short and long duration within the UL data slot.

Note that short PUCCH can be transmitted in the last one or two symbols within one slot. Further, for symbol-based data transmission, e.g., for Ultra Reliable and Low Latency Communication (URLLC), short PUCCH carrying 1 or 2 bit(s) hybrid automatic repeat request—acknowledgement (HARQ-ACK) feedback or scheduling request (SR) may be transmitted in the middle of one slot in order to meet stringent latency requirement. In this case, a short PUCCH may be transmitted in any one or two symbols within one slot.

Embodiments of the scrambling sequence generation for UL control channel are provided herein. In one embodiment, the scrambling sequence for the UL control channel is initialized as a function of at least one or more following parameters: physical or virtual cell ID, RNTI, and slot index.

In one embodiment, the scrambling sequence for NR PUCCH is initialized as:

$$c_{init}=(n_s+1)\cdot(2N_{ID}^{cell}+1)\cdot c_0+n_{RNTI} \quad (27)$$

where $c_0$ is predefined, such as, $c_0=2^{16}$.

In another embodiment, the scrambling sequence for NR PUCCH is initialized as $$c_{init}=(n_s+1)\cdot(2N_{ID}^{PUCCH}+1)\cdot c_0+n_{RNTI} \quad (28)$$

where $N_{ID}^{PUCCH}$ is the scrambling ID for NR PUCCH, which can be configured by higher layers via MSI, RMSI, SIB or RRC signaling. Where scrambling ID for PUCCH is not available at the UE, $N_{ID}^{PUCCH}=N_{ID}^{cell}$.

In one embodiment, the scrambling sequence for the UL control channel is initialized as a function of at least one or more of the following parameters: physical or virtual cell ID (or scrambling ID), starting symbol for PUCCH transmission, RNTI, and slot index.

In one option, the scrambling sequence for NR PUCCH is initialized as:

$$c_{init}=(N_s \cdot (n_s+1)+l+1) \cdot (2N_{ID}^{cell}+1) \cdot c_0+n_{RNTI} \qquad (29)$$

where $N_s$ is the number of symbols within one slot. The $N_s$ parameter may be either 7 or 14, and is configured by higher layers. Alternatively, the $N_s$ parameter may be fixed to 14 or 7.

In another embodiment, the scrambling sequence for NR PUCCH is initialized as:

$$c_{init}=(N_s \cdot (n_s+1)+l+1) \cdot (2N_{ID}^{PUCCH}+1) \cdot c_0+n_{RNTI} \qquad (30)$$

A unified scrambling sequence may be defined for both short and long PUCCH. In this case, the above equation may also apply for the long PUCCH with l=0.

FIGS. 14A and 14B are a list of the equations used by the scrambling seed generation method of FIGS. 9A-9D, along with the parameters used, according to some embodiments. The list shows the distribution of parameters in the various equations. Equations 2 and 3 are used for DM-RS, equation 4 is used for CSI-RS, and equation 5 is for PT-RS. Equations 6-7 and 9-16 are used for data, equations 17-25 are used for downlink control and equations 26-30 are used for uplink control.

In summary, the scrambling seed generation method may be implemented in a first example by an apparatus of a New Radio node B (gNB), comprising a radio frequency (RF) interface and baseband circuitry including one or more processors configured to generate a scrambling sequence of a signal based on an initial seed value, wherein the initial seed value is based on a time domain instance of the signal, modulate the generated scrambling sequence, map the modulated scrambling sequence to time-frequency resources, and send the time-frequency resources to the RF interface for transmitting to a UE.

Further to the first example or any other example discussed herein, in a second example, the time domain instance comprises an Orthogonal Frequency Division Multiplexing (OFDM) symbol number within a slot.

Further to the second example or any other example discussed herein, in a third example, the initial seed value is further calculated, by the one or more baseband processors, using a slot index parameter.

Further to the first example or any other example discussed herein, in a fourth example, the initial seed value is further calculated, by the one or more baseband processors, using a subcarrier spacing parameter of a slot.

Further to the first example or any other example discussed herein, in a fifth example, the initial seed value is further calculated by the one or more baseband processors using a cyclic prefix parameter.

Further to the first example or any other example discussed herein, in a sixth example, the scrambling sequence comprises a reference signal.

Further to the third example or any other example discussed herein, in a seventh example, the reference signal comprises a demodulation reference signal (DM-RS).

Further to the seventh example or any other example discussed herein, in an eighth example, the initial seed value is further calculated by the one or more baseband processors using a DM-RS repetition index.

Further to the seventh example or any other example discussed herein, in a ninth example, the initial seed value is further calculated by the one or more baseband processors using a configurable scrambling identifier parameter.

Further to the sixth example or any other example discussed herein, in a tenth example, the reference signal comprises a channel state information reference signal.

Further to the tenth example or any other example discussed herein, in an eleventh example, the initial seed value is further calculated by the one or more baseband processors using OFDM symbol index of CSI-RS symbol in the slot.

Further to the tenth example or any other example discussed herein, in a twelfth example, the initial seed value does not depend on the OFDM symbol number if the channel state information reference signal is configured for beam management.

Further to the first example or any other example discussed herein, in a thirteenth example, the RF interface further receives, from the UE, second time-frequency resources and the one or more baseband processors descramble the second time-frequency resources, resulting in a modulated scrambling sequence and perform estimation of a channel over which the second time-frequency resources were sent by the UE based on the modulated scrambling sequence.

In a fourteenth example, the scrambling seed generation method may be implemented by an apparatus of a User Equipment (UE), comprising a radio frequency (RF) interface and baseband circuitry including one or more processors configured to generate a scrambling sequence of a reference signal based on an initial seed value, wherein the initial seed value is based on a time domain instance of the reference signal, modulate the generated scrambling sequence of the reference signal, resulting in a modulated reference signal, map the generated scrambling sequence to time-frequency resources and send the time-frequency resources comprising the modulated reference signal to the RF interface for transmitting to a gNB.

Further to the fourteenth example or any other example discussed herein, in a fifteenth example, the time domain instance comprises an Orthogonal Frequency Division Multiplexing (OFDM) symbol number within a slot.

Further to the fourteenth example or any other example discussed herein, in a sixteenth example, the initial seed value is further calculated, by the one or more baseband processors, using a slot index.

Further to the fifteenth example or any other example discussed herein, in a seventeenth example, the initial seed value is further based on one or more of a subcarrier spacing parameter of the slot, a cyclic prefix, a scrambling identifier, a Demodulation Reference Reference Signal (DM-RS) repetition index, and an Orthogonal Frequency Division Multiplexing (OFDM) symbol index of a Channel State Information Reference Signal (CSI-RS) symbol in the slot.

Further to the fourteenth example or any other example discussed herein, in a eighteenth example, the RF interface further receives, from the gNB, second time-frequency resources comprising second modulated reference signals and the one or more baseband processors descramble the second time-frequency resources, resulting in the second modulated reference signals and perform estimation of a channel over which the second time-frequency resources were sent by the UE based on the modulated reference signals.

In a nineteenth example, the scrambling seed generation method may be implemented by an apparatus of a user equipment (UE) comprising a radio frequency (RF) interface and baseband circuitry comprising one or more processors to scramble encoded bits using a scrambling sequence, wherein the scrambling sequence is generated based on an initial seed value and the initial seed value is based on a Radio Network Temporary Identifier parameter and a codeword index, wherein the scrambled encoded bits comprise a bitwise modulo 2 addition of the scrambling sequence and the encoded bits, and the scrambled encoded bits are modulated and mapped to time-frequency resources, and send the scrambled encoded bits to the RF interface for transmission to a gNB.

Further to the nineteenth example or any other example discussed herein, in an twentieth example, the signal comprises data.

Further to the twentieth example or any other example discussed herein, in a twenty-first example, the initial seed value further is based on a scrambling identifier (ID) for data transmission.

Further to the twenty-first example or any other example discussed herein, in a twenty-second example, the scrambling ID for data transmission is configured by the one or more baseband processors using higher layer information, wherein the higher layer information is selected from a group consisting of minimum system information, remaining minimum system information, system information block, and radio resource control signaling.

Further to the nineteenth example or any other example discussed herein, in a twenty-third example, the initial seed value further is based on a physical cell identifier in response to the scrambling identifier for data transmission being unavailable.

Further to the nineteenth example or any other example discussed herein, in a twenty-fourth example, second time-frequency resources comprising a second scrambling sequence and second encoded bits are received from the gNB using the RF interface and the one or more baseband processors descramble the second encoded bits from the received second time-frequency resources by bitwise modulo 2 addition of the second scrambling sequence and the second encoded bits.

In a twenty-fifth example, the scrambling seed generation method may be implemented by an apparatus of a New Radio node B (gNB), comprising a radio frequency (RF) interface and baseband circuitry comprising one or more processors to scramble encoded bits of a downlink control channel using a scrambling sequence generated based on an initial seed value, wherein the initial seed value is based on a slot index parameter, a radio network temporary identifier parameter, and a starting symbol index of the downlink control channel transmission, wherein the scrambling encoded bits comprise a bitwise modulus 2 addition of the scrambling sequence and the encoded bits, the scrambled encoded bits are modulated and mapped to time-frequency resources, and send the scrambled bits to the RF interface for transmission to a UE.

Further to the twenty-fifth example or any other example discussed herein, in a twenty-sixth example, the initial seed value is based on a physical cell identifier, a virtual cell identifier, or a scrambling identifier.

Further to the twenty-fifth example or any other example discussed herein, in a twenty-seventh example, the initial seed value is based on a scrambling identifier and the scrambling identifier is separately configured by the one or more baseband processors for downlink and uplink transmission.

Further to the twenty-fifth example or any other example discussed herein, in a twenty-eighth example, the initial seed value is based on a scrambling identifier and the scrambling identifier is configured by the one or more baseband processors for both downlink and uplink transmissions.

Further to the twenty-fifth example or any other example discussed herein, in a twenty-ninth example, the scrambling sequence for the downlink control channel is initialized as a function of a starting symbol for a control resource set.

In a thirtieth example, the scrambling seed generation method may be implemented by an apparatus of a UE comprising a radio frequency (RF) interface and baseband circuitry comprising one or more processors to scramble encoded bits of an uplink control channel using a scrambling sequence, wherein the scrambling sequence is generated based on an initial seed value and the initial seed value is based on one or more of a slot index parameter, a radio network temporary identifier parameter, and a starting symbol index of the uplink control channel transmission, wherein the scrambled encoded bits comprise a bitwise modulo 2 addition of the scrambling sequence and the encoded bits, the scrambled encoded bits are modulated and mapped to time-frequency resources, and send the scrambled encoded bits to the RF interface for transmission to a node B base station.

Further to the thirtieth example or any other example discussed herein, in a thirty-first example, the initial seed value is further based on a physical identifier, a virtual cell identifier, or a scrambling identifier.

While the foregoing examples are illustrative of the principles in one or more particular applications, it will be apparent to those of ordinary skill in the art that numerous modifications in form, usage, and details of implementation can be made without the exercise of inventive faculty, and without departing from the principles and concepts herein and will appreciate numerous modifications and variations therefrom. It is intended that the appended claims cover all such modifications and variations as fall within the true spirit and scope of the disclosed embodiments.

We claim:

1. An apparatus of a user equipment (UE) comprising:
a radio frequency (RF) interface; and
baseband circuitry comprising one or more processors configured to:
scramble encoded bits using a scrambling sequence, wherein the scrambling sequence is generated using an initial seed value as input and the initial seed value is based on a Radio Network Temporary Identifier parameter and a codeword index, wherein the scrambled encoded bits comprise a bitwise modulo 2 addition of the scrambling sequence and the encoded bits, and the scrambled encoded bits are modulated using the initial seed value as input and mapped to time-frequency resources; and
send the scrambled encoded bits to the RF interface for transmission to a next generation Node B (gNB).

2. The apparatus of the UE of claim 1, wherein the encoded bits comprise encoded data bits.

3. The apparatus of the UE of claim 2, wherein the initial seed value is further based on a scrambling identifier (ID) for data transmission.

4. The apparatus of the UE of claim 3, wherein the one or more processors are further configured to configure the scrambling ID for data transmission using higher layer information, wherein the higher layer information comprises one or more of minimum system information, remaining minimum system information, system information block, or radio resource control signaling.

5. The apparatus of the UE of claim 1, wherein the initial seed value is further based on a physical cell identifier in response to a scrambling identifier for data transmission being unavailable.

6. The apparatus of the UE of claim 1, wherein second time-frequency resources comprising a second scrambling sequence and second encoded bits are received from the gNB using the RF interface, and the one or more processors are further configured to:
    descramble the second encoded bits from the received second time-frequency resources by bitwise modulo 2 addition of the second scrambling sequence and the second encoded bits.

7. An apparatus of a next generation node B (gNB), comprising:
    a radio frequency (RF) interface; and
    baseband circuitry comprising one or more processors configured to:
        scramble encoded bits of a downlink control channel using a scrambling sequence generated using an initial seed value as input, wherein the initial seed value is based on:
        a slot index parameter;
        a radio network temporary identifier parameter; and
        a starting symbol index of a downlink control channel transmission,
        wherein the scrambled encoded bits comprise a bitwise modulo 2 addition of the scrambling sequence and the encoded bits and the scrambled encoded bits are modulated using the initial seed value as input and mapped to time-frequency resources; and
        send the scrambled encoded bits to the RF interface for transmission to a User Equipment (UE).

8. The apparatus of the gNB of claim 7, wherein the initial seed value is based on:
    a physical cell identifier;
    a virtual cell identifier; or
    a scrambling identifier.

9. The apparatus of the gNB of claim 7, wherein the initial seed value is based on a scrambling identifier and the one or more processors are further configured to separately configure the scrambling identifier for downlink and uplink transmission.

10. The apparatus of the gNB of claim 7, wherein the initial seed value is based on a scrambling identifier and the one or more processors are further configured to configure the scrambling identifier for both downlink and uplink transmission.

11. The apparatus of the gNB of claim 7, wherein the one or more processors are further configured to initialize the scrambling sequence for the downlink control channel as a function of a starting symbol for a control resource set.

12. An apparatus of a user equipment (UE), comprising:
    a radio frequency (RF) interface; and
    baseband circuitry comprising one or more processors configured to:
        scramble encoded bits of an uplink control channel using a scrambling sequence, wherein the scrambling sequence is generated using an initial seed value as input and the initial seed value is based on one or more of:
        a slot index parameter;
        a radio network temporary identifier parameter; and
        a starting symbol index of an uplink control channel transmission;
    wherein:
        the scrambled encoded bits comprise a bitwise modulo 2 addition of the scrambling sequence and the encoded bits;
        the scrambled encoded bits are modulated using the initial seed value as input and mapped to time-frequency resources; and
        send the scrambled encoded bits to the RF interface for transmission to a next generation node B.

13. The apparatus of the UE of claim 12, wherein the initial seed value is further based on a physical cell identifier, a virtual cell identifier, or a scrambling identifier.

* * * * *